US012781485B2

(12) United States Patent
Gessi

(10) Patent No.: US 12,781,485 B2
(45) Date of Patent: Nov. 3, 2026

(54) ELECTRONIC FAUCET, METHOD OF COUPLING BETWEEN A SOURCE OF CONDITIONED WATER OR FLUID AND A FAUCET AND METHOD FOR CONTROLLING AN ELECTRONIC FAUCET

(71) Applicant: GESSI S.P.A., Serravalle Sesia (IT)

(72) Inventor: Gian Luca Gessi, Serravalle Sesia (IT)

(73) Assignee: GESSI S.P.A., Serravalle Sesia (IT)

( * ) Notice: Subject to any disclaimer, the term of this patent is extended or adjusted under 35 U.S.C. 154(b) by 0 days.

(21) Appl. No.: 18/870,762

(22) PCT Filed: May 31, 2023

(86) PCT No.: PCT/IB2023/055577
§ 371 (c)(1),
(2) Date: Dec. 2, 2024

(87) PCT Pub. No.: WO2023/233320
PCT Pub. Date: Dec. 7, 2023

(65) Prior Publication Data

US 2025/0347092 A1 Nov. 13, 2025

(30) Foreign Application Priority Data

Jun. 3, 2022 (IT) ........................ 102022000011819

(51) Int. Cl.
*E03C 1/05* (2006.01)
*E03C 1/04* (2006.01)
(Continued)

(52) U.S. Cl.
CPC ............ *E03C 1/055* (2013.01); *E03C 1/0412* (2013.01); *B67D 1/0057* (2013.01);
(Continued)

(58) Field of Classification Search
CPC .... E03C 1/055; E03C 1/0412; E03C 2201/40; F24D 17/0089; F24D 19/1063; B67D 1/0057; B67D 1/0888; B67D 2210/00118
(Continued)

(56) References Cited

U.S. PATENT DOCUMENTS 8,944,105 B2 * 2/2015 Rodenbeck ............. E03C 1/057 137/801
2007/0152074 A1 * 7/2007 Stowe ..................... E03C 1/266 236/12.1

(Continued)

FOREIGN PATENT DOCUMENTS

EP 2 672 027 A1 12/2013
WO 2021142324 A1 7/2021

OTHER PUBLICATIONS

International Search Report and Written Opinion issued in International No. PCT/IB2023/055577, dated Sep. 21, 2023.

*Primary Examiner* — Minh Q Le
(74) *Attorney, Agent, or Firm* — Jones Burke, PLLC

(57) ABSTRACT

An electronic device comprises at least a first command for selecting a supply of an outlet of a faucet with water from at least an inlet of said faucet, a data processing unit operatively associated to said first command, and a memory operatively accessible from said data processing unit. Said electronic device configured for activation in at least a self-learning operating configuration in which, the data processing unit, according to a connection of at least a first source of conditioned water or fluid to at least an inlet automatically determines an enabling of at least a first actuating combination of said first command allowing a first configuration of supplying of said outlet by means of water from at least a first selected inlet or from a first selected set of inlets. Said electronic device configured for activation in
(Continued)

at least an operating configuration of dispensing through said data processing unit.

20 Claims, 12 Drawing Sheets

(51) Int. Cl.

| | |
|---|---|
| *B67D 1/00* | (2006.01) |
| *B67D 1/08* | (2006.01) |
| *F24D 17/00* | (2022.01) |
| *F24D 19/10* | (2006.01) |

(52) U.S. Cl.
CPC .. *B67D 1/0888* (2013.01); *B67D 2210/00118* (2013.01); *E03C 2201/40* (2013.01); *F24D 17/0089* (2013.01); *F24D 19/1063* (2013.01)

(58) Field of Classification Search
USPC .......................................................... 137/801
See application file for complete search history.

(56) References Cited

U.S. PATENT DOCUMENTS

2009/0039176 A1* 2/2009 Davidson ........... G05D 23/1393 239/67
2010/0170570 A1* 7/2010 Rodenbeck ............. E03C 1/055 137/1
2011/0192495 A1* 8/2011 Deo ..................... B67D 1/0888 141/95
2012/0318364 A1* 12/2012 Sawaski .................. E03C 1/055 251/129.01
2013/0032216 A1* 2/2013 Sawaski .................. E03C 1/055 251/129.01
2013/0146160 A1* 6/2013 Davidson ........... G05D 23/1393 137/551
2013/0291978 A1* 11/2013 Baker ....................... E03C 1/04 137/801
2014/0261780 A1* 9/2014 Thomas ................ E03C 1/0404 137/801
2015/0322651 A1 11/2015 Gnauert et al.
2016/0318747 A1* 11/2016 Peirsman ............. B67D 1/0022
2017/0088410 A1* 3/2017 Wing ................... B67D 1/0076
2017/0218606 A1* 8/2017 Wang ...................... E03C 1/057
2017/0306596 A1* 10/2017 Sawaski ................ E03C 1/0412
2019/0264429 A1* 8/2019 Sawaski ................ F21V 33/004
2020/0089262 A1* 3/2020 Wales ................ G05D 23/1353
2020/0341498 A1* 10/2020 Birchfield ............... E03C 1/055
2021/0062484 A1* 3/2021 Wales ................ G05D 23/1393
2022/0074175 A1* 3/2022 Caban .................... G01K 3/005
2022/0074177 A1* 3/2022 DeVries .................. E03C 1/057
2022/0371877 A1* 11/2022 Tatera ...................... B67D 1/06
2023/0357052 A1* 11/2023 Park ........................ E03C 1/044
2024/0309622 A1* 9/2024 Machui ................... E03C 1/041

* cited by examiner

| | |
|---|---|
| 1 x ↷ + ↗ | HOT WATER (1st SOURCE) |
| 2 x ↷ + ↗ | SPARKLING WATER (2nd SOURCE) |

30
30'

ELECTRONIC FAUCET, METHOD OF COUPLING BETWEEN A SOURCE OF CONDITIONED WATER OR FLUID AND A FAUCET AND METHOD FOR CONTROLLING AN ELECTRONIC FAUCET

CROSS-REFERENCE TO RELATED APPLICATIONS

This application is a U.S. national stage application under 35 U.S.C. § 371(c) of International Application No. PCT/IB2023/055577, filed on May 31, 2023, which claims priority to Italian Patent Application No. 102022000011819, filed on Jun. 3, 2022, the entire content each of which is incorporated by reference herein in its entirety.

FIELD OF THE TECHNIQUE

The present disclosure refers to the field of the water fittings and to the field of electronic devices, in particular for servo-controlling actuators. The present disclosure also relates to the field of methods for dispensing of conditioned water.

BACKGROUND

The faucets traditionally installed in houses are provided with a body which comprises a first and a second inlet for water respectively hot and cold. These faucets are typically provided with a dispensing command which allows to adjust the water flow which is provided at an outlet of the faucet and which also allows to adjust the temperature of the water which flows from the faucet. The dispensing command acts as shutter valve for the flow coming from the first and/or from the second inlet.

Recently, faucets that further than integrating the traditional function of mixing flows of hot and cold water and/or allow the adjustment of the flow of the water in outlet, allow accessory functions as for example the dispensing of sparkling, filtered, heated to near boiling temperature or cooled to near freezing temperature water have become popular.

These faucets are provided with a plurality of inlets significantly greater than before. Opportune sources of conditioned water, for example carbonators, heaters, filters or coolers, are connected to the various inlets of the faucet.

It is up to the operator which performs the installation of the faucet to properly connect the inlets of the faucet itself to the correct source of conditioned water.

These faucets are provided with one or more commands which allow the selection of a specific source of conditioned water for the supply of the outlet.

The Applicant warns that an unpleasant situation could occur when the source of hot water at a temperature close to the boiling temperature is connected in an inappropriate manner on the wrong inlet of the faucet. In such a case, the user could place his hands under the outlet of the faucet and be hit by a scalding water flow.

US2007235091A1 discloses a faucet having two inlets (hot water and cold water) in communication with an outlet. The faucet comprises a command lever, which allows the user to select the rate and the typology of water to be dispensed. The faucet comprises a valve system connected, on the one hand, to two source ducts and, on the other hand, connected to the inlets of the faucet. The faucet comprises furthermore a control unit connected to a plurality of sensors; the control unit is configured for receiving data related to the fluid from a plurality of sensors and, by means of a control procedure, for determining if the ducts of hot and cold water are correctly connected to the valve system: in case of incorrect connection, the control unit commands the valve system to correct the wrong connection.

WO 2021/142324 A1 shows a method and a system for measuring, mixing and dispensing liquids, including alcoholic and non-alcoholic beverages. The device of WO 2021/142324 A1 is provided with a controller which is connected to some pumps and valves for helping the control of the supply of liquids from a plurality of sources. Optionally the device can have a scanner for the reading of tags present on the sources. The document WO 2021/142324 A1 is aimed at addressing the technical issue of the preparation of beverages at the point of sale in order to avoid high shipping costs.

EP 2 672 027 A1 discloses a faucet for drawing hot, cold water and other conditioned water comprising a hose from which water comes out adjusted through two control commands. The faucet here described is provided with a control unit connected to the two control commands.

There is the need to simplify the connection of the sources of water to the faucet; in particular this need is two to the purpose of avoiding that wrong connections between a specific inlet of the faucet and a particular source of conditioned water may lead to risks for the user. Taking for example a traditional faucet provided with a first inlet for hot water and a second inlet for cold water, it is observed that a possible inversion of the connection of hot and cold water supply pipes to the respective inlets would cause the risk of scalding for the user which, unaware of such an inversion, adjusts the command lever for dispensing cold water. In electronic faucets there is furthermore the need to simplify the configuration of commands of the faucet, in particular where such a faucet has a great plurality of inlets.

SUMMARY

The object of the present disclosure is here described in its salient features, which are disclosed in the following aspects. These aspects can be combined between them and/or with portions of description and/or with one or more of the claims.

According to the present disclosure it is described an electronic device (1) for controlling a faucet (10), the electronic device (1) comprising a data processing unit (2) configured for receiving in input at least an identifying signal (S) of at least a first source of conditioned water or fluid (22) of a plurality of sources of conditioned water or fluid (22-25) configured for being modularly connected to any of a plurality of inlets (12-15) of said faucet (10),

- the electronic device (1) comprising at least a first command (3) for selecting a supply of an outlet (16) of the faucet (10) with a fluid coming from at least an inlet of the plurality of inlets (12-15) of said faucet (10); said at least a first command (3) being operatively connected with said data processing unit (2);
- said data processing unit (2) being configured for assigning to said at least a first command (3) a logical association (30) between said at least a first source of conditioned water or fluid (22) and an inlet of said plurality of inlets (12-15) to which the first source of conditioned water or fluid (22) is connected, so that said first command (3), when activated, recalls the logical association (30) and causes a supply of the outlet (16) of said faucet (10) with a fluid supplied from said first source of conditioned water or fluid (22) on said inlet to which the first source of conditioned water or fluid (22) is connected, by making said inlet a first, specific, inlet (12) associated logically to said first source of conditioned water or fluid (22).

According to another non-limiting aspect, said fluid is a drinkable fluid.

According to another non-limiting aspect, said signal (S) is a signal transmitted by said at least a first source of conditioned water or fluid (22).

According to another non-limiting aspect, said signal (S) is an electromagnetic signal.

According to another non-limiting aspect, the data processing unit (2) is configured for storing, in a memory operatively associated to said data processing unit (2) and in a way at least partially automated, the logical association (30) between said at least a first source of conditioned water or fluid (22) and said first inlet (12) of said plurality of inlets (12-15).

According to another non-limiting aspect, the logical association (30) is a univocal logical association.

According to another non-limiting aspect, the data processing unit (2) is configured for receiving in inlet said identifying signal (S) of said first source of conditioned water or fluid (22) on a wired data transmission channel and/or on a wireless data transmission channel.

According to another non-limiting aspect, the electronic device (1) comprises a wired transmission channel (41, 43) comprising at least one among:

a common data bus (43) for at least the reception of said identifying signal (S) of said first source of conditioned water or fluid (22) or of a second source of conditioned water or fluid (23) of said plurality of sources of conditioned water or fluid (22-25), a plurality of data lines (41) each univocally associated to a respective inlet of said plurality of inlets (12-15).

According to another non-limiting aspect, said data processing unit (2) is configured for storing said logical association (30) through the reception of said identifying signal (S) on said data bus (43), said identifying signal (S) being an identifying signal univocally identifying a specific source of conditioned water or fluid, in particular said first source of conditioned water or fluid (22).

According to another non-limiting aspect, said data processing unit (2) is configured for storing said logical association (30) through the reception of said identifying signal (S) of the first source of conditioned water or fluid (22) on the data line (41) univocally associated to said first inlet (12).

According to another non-limiting aspect, said data bus (43) is a serial data bus, optionally a bus according to the standard RS485.

According to another non-limiting aspect, the electronic device (1) comprises a wireless data transmission channel (40, 42), in particular a radiofrequency wireless transmission channel, and comprises at least an antenna (40) operatively connected to said data processing unit (2).

According to another non-limiting aspect, said data processing unit (2) is configured for storing said logical association (30) through the reception of said identifying signal (S) through said antenna (40).

According to another non-limiting aspect, said identifying signal (S) is an identifying signal univocally identifying a specific source of conditioned water or fluid, in particular said first source of conditioned water or fluid (22).

According to another non-limiting aspect, said electronic device (1) optionally comprises a reader (61) of wireless tags (60), operatively connected to said data processing unit (2) and configured and specifically destined to read a wireless tag (60) positioned on said first source of conditioned water or fluid (22) and for receiving said identifying signal (S) at a connection of the first source of conditioned water or fluid (22) to said first inlet (12), said reader (61) of wireless tags (60) being optionally positioned in substantial correspondence of said first inlet (12).

According to another non-limiting aspect, said data processing unit (2), when said at least a first command (3) is activated, is configured for searching in said memory the logical association (30) corresponding to said first command (3).

According to another non-limiting aspect, said data processing unit (2), when said at least a first command (3) is activated, is configured for transmitting at least one among a signal of activation toward said first source of conditioned water or fluid (22) and a signal of opening of at least a valve (18) operatively associated to said first inlet (12) for determining the supply of the outlet (16) of the faucet (10) through water coming from said first source of conditioned water or fluid (22) and/or from said first inlet.

According to another non-limiting aspect, the valve (18) is positioned within said faucet (10) or is positioned within said first source of conditioned water or fluid (22).

According to another non-limiting aspect, the transmission of said at least one among the signal of activation toward said first source of conditioned water or fluid (22) and the signal of opening of said at least a valve (18) operatively associated to said first inlet (12) takes place on said data bus (43) or on said data line (41) operatively associated to said first inlet (12) or on said wireless data transmission channel (40, 42).

According to another non-limiting aspect, the device (1) comprises a command module and said at least a first command (3) is positioned on said command module.

According to another non-limiting aspect, said at least a first command (3) and/or said command module is configured for being installed in a remote position with respect to said faucet (10), preferably in a remote position with respect to a main body (10B) of said faucet (10) and/or is configured and specifically destined to be installed above a top (50) of a sink and/or of a kitchen or to be embedded in a top (50) of said sink and/or of said kitchen.

According to another non-limiting aspect, said at least a first command (3) is a virtual command made accessible on a software platform that can be installed on an electronic portable device or electronically accessed through an electronic portable device.

According to another non-limiting aspect, said data processing unit (2) is configured for enabling a dispensing of conditioned water or fluid according to customized dispensing volume of conditioned water or fluid and/or according to a customized dispensing time of conditioned water or fluid.

According to another non-limiting aspect, said dispensing volume and/or dispensing time is selected on the basis of at least a predefined activation or actuating sequence of the at least a first command (3), preferably on the basis of a first and a second activation or actuating sequence of said at least a first command (3).

According to another non-limiting aspect, in said self-learning operating configuration said data processing unit (2) is configured for storing in said memory a dispensing datum corresponding to said customized dispensing volume of conditioned water or fluid and/or to said customized dispensing time of conditioned water or fluid, optionally after said predefined activation or actuating sequence of said at least a first command (3), preferably after the first and of the second activation or actuating sequence of said at least a first command (3).

According to another non-limiting aspect, in said operating configuration of dispensing said predefined activation or actuating sequence of the at least a first command (3) determines an automatic loading, from said memory, of said dispensing data corresponding to said customized dispensing volume of conditioned water or fluid and/or to said customized dispensing time of conditioned water or fluid.

According to another non-limiting aspect, in said operating configuration of dispensing, said predefined activation or actuating sequence of the at least a first command (3) determines a dispensing of conditioned water or fluid from said outlet (16) for a volume and/or time corresponding to the customized dispensing volume of conditioned water or fluid and/or to the water dispensing time of said dispensing data.

According to another non-limiting aspect, said dispensing data corresponds to an operating configuration of dispensing customized by the user.

According to another non-limiting aspect, said data processing unit (2) is configured for storing in said memory at least a dispensing datum, and optionally a plurality of dispensing data, for each inlet of said plurality of inlets (12-15) and/or for each source of said plurality of sources of conditioned water or fluid (22-25) for defining a corresponding plurality of operating configurations of dispensing customized by the user.

According to the present disclosure it is further described an electronic faucet (10) for water dispensing, comprising:

- a body (10B) of the faucet;
- at least a first command of dispensing (10C) for the adjustment of at least one among a water flow and a temperature of the water, said dispensing command (10C) being preferably installed on said body (10B);
- an outlet (16) for water dispensing, positioned in a predefined position, preferably an ending position, of said body (10B);
- a plurality of inlets (12-15) modularly selectable and/or installable, each of which is configured and specifically destined to be connected with any source of conditioned water or fluid of a plurality of sources of conditioned water or fluid (22-25) configured for supplying in use conditioned water or fluid to said faucet (10);
- an electronic device (1) according to one or more of the aspects herein described.

According to another non-limiting aspect, the faucet (10) comprises at least a, preferably a plurality of, connection modules (100*a*, 100*b*, 100*c*) for the inlet of conditioned water or fluid, and wherein at least part of the inlets of said plurality of inlets (12-15) is arranged on said at least a, preferably on said plurality of, connection modules (100*a*, 100*b*, 100*c*); optionally wherein at least a first part of said plurality of inlets (12-15) is arranged on said at least a module, preferably on each module of said plurality of connection modules (100*a*, 100*b*, 100*c*) and wherein a second part of said plurality of inlets (12-15) is directly connected to the body (10B) of the faucet (10) and wherein the at least a module, preferably at least one of said plurality of connection modules (100*a*, 100*b*, 100*c*), is configured and specifically destined to be connected to an inlet of another connection module (100*a*, 100*b*, 100*c*) for the inlet of conditioned water or fluid or to one of the inlets of the second part of said plurality of inlets (12-15).

According to another non-limiting aspect, said plurality of inlets (12-15) is directly realized on said faucet (10) or is realized in at least a connection module (100*a*, 100*b*, 100*c*) configured for being connected to the faucet (10).

According to another non-limiting aspect, the inlets of said plurality of inlets (12-15) are equal between them and are configured for being selectively couplable, indifferently, to each source of said plurality of sources of conditioned water or fluid (22-25).

According to another non-limiting aspect, said plurality of inlets (12-15) comprises inlets equal, in size and/or shape and/or color and/or conformation.

According to another non-limiting aspect, each inlet of said plurality of inlets (12-15) is a screw inlet.

According to another non-limiting aspect, said faucet (10) comprises a first operating inlet (11*a*) configured for receiving in use hot water supplied by a distribution network and a second operating inlet (11*b*) configured for receiving in use cold water supplied by a distribution network.

According to another non-limiting aspect, said distribution network is a domestic distribution network.

According to another non-limiting aspect, the faucet (10) comprises a plurality of valves (18) each connected to a respective inlet of said plurality of inlets (12-15).

According to another non-limiting aspect, each valve of the plurality of valves (18) is a remotely controllable valve, in particular electrically controllable, through a signal of opening transmitted from said data processing unit (2).

According to another non-limiting aspect, said at least a first command of dispensing (10C) is installed on said body (10B) or is installed in a position separated with respect to said body (10B).

According to the present disclosure it is further described an electronic device (1) for controlling a faucet (10), the electronic device (1) comprising:

- at least a first command (3) for selecting a supply of an outlet (16) of the faucet (10) with water coming from at least an inlet of a plurality of inlets (12-15) of said faucet (10);
- a data processing unit (2) operatively associated to said at least a first command (3);
- a memory operatively accessible from said data processing unit (2);
  - wherein said data processing unit (2) is configured for enabling a dispensing of conditioned water or fluid according to customized dispensing volume of conditioned water or fluid and/or according to a customized dispensing time of conditioned water or fluid; said dispensing volume and/or dispensing time being selected on the basis of at least a predefined activation or actuating sequence of the at least a first command (3), preferably on the basis of a first and a second activation or actuating sequence of said at least a first command (3), and/or wherein
  - said electronic device (1) is configured for being activated in at least a self-learning operating configuration, and wherein in said self-learning operating configuration said data processing unit (2) is configured for storing in said memory a dispensing datum corresponding to said customized dispensing volume of conditioned water or fluid and/or to said customized dispensing time of conditioned water or fluid, optionally after of said predefined activation or actuating sequence of said at least a first command (3), preferably after of the first and of the second activation or actuating sequence of said at least a first command (3).

According to another non-limiting aspect, said electronic device (1) is configured for being activated in at least a self-learning operating configuration wherein, the data processing unit (2), according to a connection of at least a first source of conditioned water or fluid (22) of a plurality of sources of conditioned water or fluid (22-25) to at least an inlet of said plurality of inlets (12-15), determines automatically an enabling of at least a first combination of actuation of said at least a first command (3) allowing a first configuration of supply of said outlet (16) by means of water coming from at least a first selected inlet of said plurality of inlets (12-15) or from a first selected set of inlets of said plurality of inlets (12-15), said first inlet or said first set of inlets being univocally associated, in an associative datum (30) stored in said memory, to said first source of conditioned water or fluid (22);

said electronic device being configured for being activated in at least an operating configuration of dispensing, wherein an activation of said first command (3) in said first combination of actuation determines, through said data processing unit (2) and in an automatic way, a loading of the first associative datum (30) from said memory, and a dispensing on said outlet (16) of water coming from said first selected inlet of said plurality of inlets (12-15) or from said first selected set of inlets of said plurality of inlets (12-15) according to said first associative datum (30).

According to another non-limiting aspect, at least one among the electronic device (1) and the faucet (10) comprises at least a sensor, configured for transmitting a signal toward the data processing unit (2), said signal being indicative of a feature of said conditioned water or fluid.

According to another non-limiting aspect, the data processing unit (2) is configured for comparing said signal with the range selected of values or with the threshold and, when occur the conditions of exceeding of the threshold or the outlet from the range selected of values by said signal, the data processing unit (2) is configured for determining a transmission of an alarm message, and/or for determining an automatic, and preferably immediate, interruption of the dispensing of the conditioned water or fluid from the outlet (16).

According to another non-limiting aspect, said sensor comprises at least one among a sensor of temperature or a sensor suitable for detecting the presence and/or the quantity of one or more chemical substances in said conditioned water and/or in said fluid (22-25).

According to the present disclosure it is further described a method of coupling between a source of conditioned water or fluid and a faucet, comprising:

a supply of an electronic faucet (10) for water dispensing, comprising a body (10B), at least a first command of dispensing (10C) for the adjustment of at least one among a water flow and a temperature of the water, an outlet (16) for water dispensing, positioned in a predefined position, preferably an ending position, of said body (10B), a plurality of inlets (12-15) modularly selectable and/or installable, each of which is configured and specifically destined to be connected with any source of conditioned water or fluid of a plurality of sources of conditioned water or fluid (22-25) configured for supplying in use conditioned water or fluid to said faucet (10) and a command (3) for the selection of the supply of conditioned water or fluid from at least an inlet of said plurality of inlets (12-15) to said outlet (16);

a connection of a first source of conditioned water or fluid (22) of said plurality of sources of conditioned water or fluid (22-25) to any inlet of a plurality of inlets (12-15) of said faucet (10).

According to another non-limiting aspect, the method comprises a step of connection of at least a, preferably a plurality of, connection modules (100*a*, 100*b*, 100*c*) for the inlet of conditioned water or fluid to the body of said faucet (10), in such a way that at least part of the inlets of said plurality of inlets (12-15) is arranged on said at least a module, preferably on said plurality of connection modules (100*a*, 100*b*, 100*c*); optionally in such a way that at least a first part of said plurality of inlets (12-15) is arranged on said at least a module, preferably on each module of said plurality of connection modules (100*a*, 100*b*, 100*c*) and a second part of said plurality of inlets (12-15) is directly connected to the body (10B) of the faucet (10), the at least a module, preferably at least one of said plurality of connection modules (100*a*, 100*b*, 100*c*), being configured and specifically destined to be connected to an inlet of another connection module (100*a*, 100*b*, 100*c*) for the inlet of conditioned water or fluid or to one of the inlets of the second part of said plurality of inlets (12-15).

According to another non-limiting aspect, the method comprises a logical connection between said first source of conditioned water or fluid (22) and a data processing unit (2) of an electronic device (1) operatively associated to said faucet (10).

According to another non-limiting aspect, said logical connection determines a transmission of at least an identifying signal (S) of said first source of conditioned water or fluid (22) from the first source of conditioned water or fluid (22) to the data processing unit (2).

According to another non-limiting aspect, the method comprises an assignation, to a first command (3) of said faucet (10), of a logical association (30) for the selection of a supply of the outlet (16) of the faucet with a fluid coming from the inlet of the plurality of inlets (12-15) of said faucet (10) to which said first source of conditioned water or fluid (22-25) is connected.

According to another non-limiting aspect, said assignation makes said inlet become a first inlet (12) associated logically (30) to said first source of conditioned water or fluid (22).

According to another non-limiting aspect, said assignation determines, at an activation of said first command (3), a subsequent step of supply of the outlet (16) of said faucet (10) with a fluid supplied from said first source of conditioned water or fluid (22) on said first inlet (12).

According to another non-limiting aspect, the method comprises a step of transmission of at least an identifying signal (S), said transmission being carried out from said at least a first source of conditioned water or fluid (22).

According to another non-limiting aspect, said signal (S) is an electromagnetic signal.

According to another non-limiting aspect, said step of supply takes place by effect of the activation of said first command (3).

According to another non-limiting aspect, said association is a univocal logical association.

According to another non-limiting aspect, the method comprises a storage at least partially automated, in a memory operatively associated to said data processing unit (2), of a logical association (30) between said at least a first source of conditioned water or fluid (22) and said first inlet (12) of said plurality of inlets (12-15).

According to another non-limiting aspect, the logical connection between said first source of conditioned water or fluid (22) and said data processing unit (2) determines the transmission of said at least an identifying signal (S) of said first source of conditioned water or fluid (22) on a wired data transmission channel and/or on a wireless data transmission channel.

According to another non-limiting aspect, the method comprises an activation of said first command (3) and a subsequent step of supply of the outlet (16) of said faucet (10) with a fluid supplied from said first source of conditioned water or fluid (22) on said first inlet (12).

According to another non-limiting aspect, the step of supply takes place by effect of the activation of said first command (3).

According to another non-limiting aspect, the logical connection between said first source of conditioned water or fluid (22) and said data processing unit (2) determines the transmission of said at least an identifying signal (S) of said first source of conditioned water or fluid (22) on a wired data transmission channel comprising at least one among:

- a common data bus (43) for at least the reception of said identifying signal (S) of said first source of conditioned water or fluid (22) or of a second source of conditioned water or fluid (23) of said plurality of sources of conditioned water or fluid (22-25);
- a plurality of data lines (41) each univocally associated to a respective inlet of said plurality of inlets (12-15).

According to another non-limiting aspect, the storage takes place after a reception of said identifying signal (S) on said data bus (43), said identifying signal being an identifying signal univocally identifying a specific source of conditioned water or fluid, in particular said first source of conditioned water or fluid (22).

According to another non-limiting aspect, the storage takes place after of a reception of said identifying signal (S) of the first source of conditioned water or fluid (22) on the data line (41) univocally associated to said first inlet (12).

According to another non-limiting aspect, the logical connection between said first source of conditioned water or fluid (22) and said data processing unit (2) determines the transmission of said at least an identifying signal (S) of said first source of conditioned water or fluid (22) on a wireless transmission channel (40, 42).

According to another non-limiting aspect, said wireless transmission channel is a radiofrequency wireless channel.

According to another non-limiting aspect, at least an antenna (40) is operatively connected to said data processing unit (2).

According to another non-limiting aspect, the storage takes place after of a reception of said identifying signal (S) through said antenna (40).

According to another non-limiting aspect, said identifying signal (S) is an identifying signal univocally identifying a specific source of conditioned water or fluid, in particular said first source of conditioned water or fluid (22).

According to another non-limiting aspect, the logical connection between said first source of conditioned water or fluid (22) and said data processing unit (2) determines the transmission of said at least an identifying signal (S) of said first source of conditioned water or fluid (22) through a wireless tag (60) positioned on said first source of conditioned water or fluid (22).

According to another non-limiting aspect the method comprises a reception of said identifying signal (S) of said first source of conditioned water or fluid (22) by a reader (61) of wireless tags (60) operatively connected to said data processing unit (2) and configured and specifically destined to read the wireless tag (60) positioned on said first source of conditioned water or fluid (22).

According to another non-limiting aspect, said reader (61) of wireless tags (60) is optionally positioned in substantial correspondence of said first inlet (12).

According to another non-limiting aspect, the method comprises a step of activation of said first command (3), a step of searching, in said memory, the logical association (30) corresponding to said first command (3), and a step of transmission of at least one among a signal of activation toward said first source of conditioned water or fluid (22) and a signal of opening of at least a valve (18) operatively associated to said first inlet (12) for allowing the supply of the outlet (16) of the faucet (10) through water or fluid coming from said first source of conditioned water or fluid (22) and/or from said first inlet.

According to another non-limiting aspect, said step of searching and said step of transmission take place after, and as consequence, of said activation of said first command (3).

According to another non-limiting aspect, the valve (18) is positioned within said faucet (10) or is positioned within said first source of conditioned water or fluid (22).

According to another non-limiting aspect, the step of transmission of said at least one among the signal of activation toward said first source of conditioned water or fluid (22) and the signal of opening of at least a valve (18) takes place on said data bus (43) or on said data line (41) operatively associated to said first inlet (12) or on said wireless data transmission channel (40, 42).

According to the present disclosure is also described a source of conditioned water or fluid (22-25), configured for being connected in correspondence of an inlet (12-15) of an electronic faucet (10) for supplying to said electronic faucet (10), in use, conditioned water or fluid;

- the source of conditioned water or fluid having at least a transmitter configured for transmitting an identifying signal (S), optionally an identifying univocal signal, destined to identify, optionally univocally, said source of conditioned water or fluid (22-25).

According to another non-limiting aspect, said source of conditioned water or fluid (22-25) is configured for dispensing a first typology of conditioned water and at least a second typology of conditioned water, optionally in temporal simultaneity, and/or is configured for dispensing a first typology of conditioned water and said fluid, optionally in temporal simultaneity.

According to another non-limiting aspect, said transmitter is an electronic transmitter.

According to another non-limiting aspect, said transmitter is configured for transmitting said identifying signal (S) toward an electronic device (1) of said faucet (10) or operatively connected to said faucet (10).

According to the present disclosure is also described a kit comprising a faucet (10) according to one or more of the aspects herein described and a source according to the preceding aspect.

According to another non-limiting aspect, said source of conditioned water or fluid (22-25) comprises at least a hydraulic connection configured for allowing an intake of water from a distribution network, preferably for allowing an intake of water from a distribution network of water potabile, in particular domestica.

According to another non-limiting aspect, said source of conditioned water or fluid (22-25) comprises at least a data connection, configured for allowing a transmission, optionally a transceiving, of data toward, optionally toward and from, said electronic device (1) and/or toward said faucet (10).

According to another non-limiting aspect, said transmitter is a wireless transmitter, optionally a wireless tag (60), preferably a tag RFid.

According to another non-limiting aspect, said source of conditioned water or fluid comprises a hydraulic connector (26), configured and specifically destined to be connected with an inlet (12-15) of said faucet (10).

According to another non-limiting aspect, said transmitter is positioned in substantial correspondence of said hydraulic connector (26).

According to another non-limiting aspect, said source of conditioned water or fluid (22-25) comprises at least one among a gasifier, optionally a carbon dioxide adder, a water heater or boiler, optionally a water heater configured for bringing, in use, a temperature of the water to a value close to a boiling temperature, a water cooler, optionally a water cooler configured for bringing, in use, a temperature of the water to a value close to a freezing temperature, a filter, optionally configured for carrying out a mechanical and/or chemical filtration of the water.

According to another non-limiting aspect, said carbon dioxide adder comprises a pressurized bottle for the addition of carbon dioxide.

According to another non-limiting aspect, the method comprises a connection of at least one among a gasifier, optionally a carbon dioxide adder, a water heater or boiler, optionally a water heater configured for bringing, in use, a temperature of the water to a value close to a boiling temperature, a water cooler, optionally a water cooler configured for bringing, in use, a temperature of the water to a value close to a freezing temperature, a filter, optionally configured for carrying out a mechanical and/or chemical filtration of the water, to an inlet (12-15) of said faucet (10)

According to another non-limiting aspect, said source of conditioned water or fluid (22) comprises a unit wherein are embedded:

- a boiler (22*b*) configured for bringing, in use, a temperature of the water to a value close to a boiling temperature,
- at least one among a filter (22*f*) and a safety valve (22*v*), optionally a non-return valve.

According to another non-limiting aspect, the method comprises a connection, to an inlet (12-15) of the faucet (10) of a source of conditioned water or fluid (22) comprises a unit wherein are embedded:

- a boiler (22*b*) configured for bringing, in use, a temperature of the water to a value close to a boiling temperature,
- at least one among a filter (22*f*) and a safety valve (22*v*), optionally a non-return valve.

According to another non-limiting aspect, said unit comprises an inlet (22*k*) configured for being supplied in use with water coming from a distribution network, optionally a domestic network, said inlet (22*k*) being directly connected to at least one among said filter (22*f*) and/or said safety valve (22*v*).

According to another non-limiting aspect, the method comprises a step of supply of water coming from a distribution network, optionally a domestic network, to an inlet (22*k*) of said unit, said inlet (22*k*) being directly connected to at least one among said filter (22*f*) and/or said safety valve (22*v*).

According to another non-limiting aspect, said unit comprises an outlet (22*u*) configured for being directly connected with an inlet (12-15) of said faucet (10) optionally through a duct, said outlet (22*u*) being connected directly with an outlet of said boiler (22*b*).

According to another non-limiting aspect, the method comprises the connection of an outlet (22*u*) of said unit to an inlet (12-15) of said faucet, optionally through a duct; said outlet (22*u*) being connected directly with an outlet of said boiler (22*b*).

According to another non-limiting aspect, between the at least one among the filter (22*f*) and the non-return valve (22*v*) and an inlet of the boiler (22*b*) is arranged a three-way connection having a first way connected with an outlet of the filter (22*f*), a second way connected with the inlet of said boiler (22*b*) and a third way connected with an auxiliary outlet (22*a*) of said unit and destined to be connected with an anti-reflux device (22*i*) in turn configured for being connected with a sewage outlet.

According to another non-limiting aspect, the method comprises the connection of an auxiliary outlet (22*a*) of said unit with an anti-reflux device (22*i*) in turn configured for being connected with a sewage outlet.

According to another non-limiting aspect, said auxiliary outlet (22*a*) is connected with a third way of a three-way connection arranged between the at least one among the filter (22*f*) and the non-return valve (22*v*) and an inlet of the boiler (22*b*).

According to another non-limiting aspect, a second way is connected with the inlet of said boiler (22*b*) and wherein a first inlet of said connection is connected with an outlet of said filter (22*f*).

According to another non-limiting aspect, the method comprises a step of positioning of said at least a first command (3) on a command module.

According to another non-limiting aspect, the method comprises a step of installation of said at least a first command (3) and/or of said command module in remote position with respect to said faucet (10), preferably in remote position with respect to a main body (10B) of said faucet (10) and/or comprises a step of installation of said at least a first command (3) and/or of said command module above a top (50) of a sink and/or of a kitchen or to be embedded in a top (50) of said sink and/or of said kitchen.

According to another non-limiting aspect, the method comprises a step of access to said at least a first command (3) through a software platform installed on an electronic portable device or electronically accessed through an electronic portable device.

According to the present disclosure it is further described a method for controlling a faucet (10), comprising:

- an activation of an self-learning operating configuration wherein a data processing unit (2) of an electronic device (1) for controlling said faucet (10) operatively associated to at least a first command (3) for selecting a supply of an outlet (16) of the faucet (10) with conditioned water or fluid coming from at least an inlet of a plurality of inlets (12-15) of said faucet (10) and being part of said electronic device (1), according to a connection of at least a first source of conditioned water or fluid (22) of a plurality of sources of conditioned water or fluid (22-25) to at least an inlet of said plurality of inlets (12-15), carries out automatically an enabling of at least a first combination of actuation of said at least a first command (3), and wherein said data processing unit (2) determines a storage, in said memory, of a dispensing datum corresponding to said customized dispensing volume of conditioned water or fluid and/or to said customized dispensing time of conditioned water or fluid, optionally after of said predefined activation or actuating sequence of said at least a first command (3), preferably after of the first and of the second activation or actuating sequence of said at least a first command (3)

and/or comprising a step of enabling, through the data processing unit (2), of a dispensing of conditioned water or fluid according to a customized dispensing volume of conditioned water or fluid and/or according to a customized dispensing time of conditioned water or fluid; said dispensing volume and/or dispensing time being selected on the basis of at least a predefined activation or actuating sequence of said at least a first command (3), preferably on the basis of a first and a second activation or actuating sequence of said at least a first command (3).

According to another non-limiting aspect, the method comprises:

- a loading from an operatively accessible memory to said data processing unit (2) of a first associative datum (30) identifying a univocal association between said first inlet or said first set of inlets and said first source of conditioned water or fluid (22);
- wherein said first combination of actuation is specifically destined to allow, in use, a first configuration of supply of said outlet (16) by means of water coming from at least said first selected inlet of said plurality of inlets (12-15) or from said first selected set of inlets of said plurality of inlets (12-15), according to said first associative datum (30);
- an activation of an operating configuration of dispensing, wherein when there is an activation of said first command (3) in said first combination of actuation, the data processing unit (2), loads from said memory said first associative datum (30), and causes a dispensing on said outlet (16) of water coming from said first selected inlet of said plurality of inlets (12-15) or from said first selected set of inlets of said plurality of inlets (12-15).

According to another non-limiting aspect of the method, after the activation of said self-learning operating configuration said data processing unit (2) determines a storage, in said memory, of at least a dispensing datum, and optionally of a plurality of dispensing data, for each inlet of said plurality of inlets (12-15) and/or for each source of said plurality of sources of conditioned water or fluid (22-25) for defining a corresponding plurality of operating configurations of dispensing customized by the user.

According to the present disclosure is described a computer program, comprising portions of software code which when executed cause the execution of one or more steps of the method according to one or more of the aspects herein described.

According to the present disclosure is herein described an electronic device (1) for controlling a faucet (10), the electronic device (1) comprising:

- at least a first command (3) for selecting a supply of an outlet (16) of the faucet (10) with water coming from at least an inlet of a plurality of inlets (12-15) of said faucet (10);
- a data processing unit (2) operatively associated to said at least a first command (3);
- a memory operatively accessible from said data processing unit (2);

said electronic device (1) being configured for being activated in at least a self-learning operating configuration wherein, the data processing unit (2), according to a connection of at least a first source of conditioned water or fluid (22) of a plurality of sources of conditioned water or fluid (22-25) to at least an inlet of said plurality of inlets (12-15), automatically determines an enabling of at least a first combination of actuation of said at least a first command (3) allowing a first configuration of supplying of said outlet (16) by means of water coming from at least a first selected inlet of said plurality of inlets (12-15) or from a first selected set of inlets of said plurality of inlets (12-15), said first inlet or said first set of inlets being univocally associated, in an associative datum (30) stored in said memory, to said first source of conditioned water or fluid (22);

said electronic device being configured for being activated in at least an operating configuration of dispensing, wherein an activation of said first command (3) in said first combination of actuation determines, through said data processing unit (2) and in an automatic way, a loading of the first associative datum (30) from said memory, and a dispensing on said outlet (16) of water coming from said first selected inlet of said plurality of inlets (12-15) or from said first selected set of inlets of said plurality of inlets (12-15) according to said first associative datum (30).

According to the present disclosure is herein described an electronic device (1) for controlling a faucet (10), the electronic device (1) comprising:

- at least a first command (3) for selecting a supply of an outlet (16) of the faucet (10) with water coming from at least an inlet of a plurality of inlets (12-15) of said faucet (10);
- a data processing unit (2) operatively associated to said at least a first command (3);
- a memory operatively accessible from said data processing unit (2);

said electronic device (1) being configured for being activated in at least a self-learning operating configuration wherein said at least a first command (3), when activated in a first combination of actuation, determines, through said data processing unit (2) and in an automatic way, a storage, through a first associative datum (30), of a first configuration of supply of said outlet (16) by means of water coming from at least a first selected inlet of said plurality of inlets (12-15) or from a first selected set of inlets of said plurality of inlets (12-15).

According to another non-limiting aspect, in said self-learning operating configuration, said first command (3), when activated in a second combination of activation, determines, through said data processing unit (2) and in an automatic way, a storage, through a second associative datum (30), of a second configuration of supply of said outlet (16) by means of water coming from at least a second selected inlet of said plurality of inlets (12-15) or from a second selected set of inlets of said plurality of inlets (12-15).

According to another non-limiting aspect, said electronic device is configured for being activated in at least an operating configuration of dispensing, wherein an activation of said first command (3) in said first combination of actuation determines, through said data processing unit (2) and in an automatic way, a loading of the first associative datum (30) from said memory, and a dispensing on said outlet (16) of water coming from said first selected inlet of said plurality of inlets (12-15) or from said first selected set of inlets of said plurality of inlets (12-15) according to said first associative datum (30).

According to another non-limiting aspect, said electronic device is configured for being activated in at least an operating configuration of dispensing, wherein an activation of said first command (3) in said second combination of activation determines, through said data processing unit (2) and in an automatic way, a loading of the second associative datum (30) from said memory, and a dispensing on said outlet (16) of water coming from said second selected inlet of said plurality of inlets (12-15) or from said second selected set of inlets of said plurality of inlets (12-15) according to said second associative datum (30).

According to another non-limiting aspect, in said self-learning operating configuration, the data processing unit (2), according to a connection of at least a second source of conditioned water or fluid (23) of said plurality of sources of conditioned water or fluid (22-25) to at least an inlet of said plurality of inlets (12-15), determines automatically an enabling of at least a second combination of activation of said at least a first command (3) allowing a second configuration of supply of said outlet (16) by means of water coming from at least a second selected inlet of said plurality of inlets (12-15) or from a second selected set of inlets of said plurality of inlets (12-15).

According to another non-limiting aspect, the second combination of activation is different from the first combination of actuation.

According to another non-limiting aspect, the second selected inlet is different from the first selected inlet and/or the second selected set of inlets is different from the first selected set of inlets.

According to another non-limiting aspect, said second inlet or said second set of inlets is univocally associated, in a second associative datum (30') stored in said memory, to said second source of conditioned water or fluid (23).

According to another non-limiting aspect, in said operating configuration of dispensing, an activation of said at least a first command (3) in said second combination of activation determines, through said data processing unit (2) and in an automatic way, a loading of the second associative datum (30') from said memory.

According to another non-limiting aspect, in said operating configuration of dispensing, an activation of said at least a first command (3) in said second combination of activation determines, through said data processing unit (2) and in an automatic way, a dispensing on said outlet (16) of water coming from said second selected inlet of said plurality of inlets (12-15) or from said second selected set of inlets of said plurality of inlets (12-15) according to said second associative datum (30').

According to another non-limiting aspect, in the operating configuration of dispensing said data processing unit (2), when there is an activation of said at least a first command (3) in said first or said second combination of activation, is configured for transmitting at least one among a signal of activation toward said first source of conditioned water or fluid (22) or said second source of conditioned water or fluid (23) and a signal of opening of at least a valve (18) operatively associated to one of the inlets of the plurality of inlets (12-15) for determining the supply of the outlet (16) of the faucet (10) through water coming from said first selected inlet or from said first selected set of inlets or, respectively, from said second selected inlet or from said second selected set of inlets.

According to another non-limiting aspect, said at least a first command (3) comprises at least a first and a second button, and/or comprises at least a rotatable and/or translatable controller and/or comprises at least a monitor (**3*m***) operatively connected with said first and/or second button and/or with said at least a rotatable and/or translatable controller.

According to another non-limiting aspect, said first and/or said second combination of activation comprises a rotation and/or translation of said rotatable and/or translatable controller and/or wherein the activation of said at least a first command (3) in said first or second combination of activation determines a transmission of a first and of a second signal (S1, S2) to said at least a monitor (**3*m*) and/or wherein in said self-learning operating configuration said data processing unit (2) transmits at least a instruction signal (S3) to said monitor (3*m***).

According to another non-limiting aspect, said rotatable and/or translatable controller comprises at least a ring (**3*g*) clockwise or anti-clockwise rotatable and/or translatable along at least a predefined axis (X, Y, Z), preferably along at least a translation axis parallel to a rotation axis (X) of the ring and/or along at least a first axis (Y), and optionally a second axis (Z), at least one among said first axis and said second axis being orthogonal to an rotation axis (X) of the ring (3*g*), and optionally wherein at least a between said first and said second combination of activation comprises a composite movement of rototranslation of said ring (3*g***).

According to another non-limiting aspect, said ring rotatable and/or translatable has at least a rest and stable position and an unstable position, and wherein said composite movement determines a movement of said ring from said rest position and stabile to said unstable position.

According to another non-limiting aspect, at least one among said first or second signal (S1, S2) comprises at least one datum indicative of a conditioning of the water dispensed through the outlet (16) of the faucet (10), in particular one datum indicative of a temperature, and/or gasifying and/or filtration of the water dispensed through the outlet (16) of the faucet (10).

According to another non-limiting aspect, said at least one among said first or second signal causes a time-variant graphical representation on said monitor.

According to another non-limiting aspect, said at least one among said first or second signal contains an identifying datum of a source of conditioned water or fluid (22-25) operatively connected to said at least an inlet (12-15).

According to another non-limiting aspect, said electronic device (1) comprises optionally a vibration or sound unit (**3*v***).

According to another non-limiting aspect, at least one among said first or said second signal causes a temporary activation of said vibration or sound unit (**3*v***).

According to another non-limiting aspect, in said operating configuration of dispensing, an activation of said at least a first command (3) in said first combination of actuation and/or in said second combination of activation determines, through said data processing unit (2) and in an automatic way, a loading of said first associative datum (30) or of said second associative datum (30').

According to another non-limiting aspect, in said operating configuration of dispensing, an activation of said at least a first command (3) in said first combination of actuation and/or in said second combination of activation determines, through said data processing unit (2) and in an automatic way a dispensing on said outlet (16) of a predefined amount of water defined on volume and/or time basis.

According to another non-limiting aspect, said at least a first command (3) comprises a voice activation module.

According to another non-limiting aspect, said first combination of actuation and/or said second combination of activation is a combination of activation at least partially by voice.

According to another non-limiting aspect, said data processing unit (2) is configured for transmitting a control signal toward a source of conditioned water or fluid (22-25).

According to another non-limiting aspect, said control signal is specifically destined to put said at least a source of conditioned water or fluid (22-25) in a condition of low energy consumption and/or a deactivate an operational functioning of said source of conditioned water or fluid for a predetermined period of time; said control signal being optionally transmitted from said data processing unit (2) at an activation of said at least a command (3).

According to another non-limiting aspect, said source of conditioned water or fluid (22-25) is configured and specifically destined to receive in input a control signal specifically destined to put it in a condition of low energy consumption and/or to put it in a state of deactivation of an operational functioning.

According to the present disclosure is further described a method for controlling a faucet (10), comprising:

an activation of an self-learning operating configuration, wherein a data processing unit (2) of an electronic device (1) for controlling said faucet (10) operatively associated to at least a first command (3) for selecting a supply of an outlet (16) of the faucet (10) with conditioned water or fluid coming from at least an inlet of a plurality of inlets (12-15) of said faucet (10) and being part of said electronic device (1), according to a connection of at least a first source of conditioned water or fluid (22) of a plurality of sources of conditioned water or fluid (22-25) to at least an inlet of said plurality of inlets (12-15), carries out automatically an enabling of at least a first combination of actuation of said at least a first command (3), a loading from a memory operatively accessible to said data processing unit (2) of a first associative datum (30) identifying a univocal association between said first inlet or said first set of inlets and said first source of conditioned water or fluid (22);

wherein said first combination of actuation is specifically destined to allow, in use, a first configuration of supply of said outlet (16) by means of water coming from at least said first selected inlet of said plurality of inlets (12-15) or from said first selected set of inlets of said plurality of inlets (12-15), according to said first associative datum (30);

an activation of an operating configuration of dispensing, wherein when there is an activation of said first command (3) in said first combination of actuation, the data processing unit (2), loads from said memory said first associative datum (30), and causes a dispensing on said outlet (16) of water coming from said first selected inlet of said plurality of inlets (12-15) or from said first selected set of inlets of said plurality of inlets (12-15).

According to another non-limiting aspect, the first command (3) is part of said electronic device (1).

According to another non-limiting aspect, the method comprises a step of enabling, through the data processing unit (2), of a dispensing of conditioned water or fluid according to customized dispensing volume of conditioned water or fluid and/or according to a customized dispensing time of conditioned water or fluid.

According to another non-limiting aspect, said dispensing volume and/or dispensing time is selected on the basis of at least a predefined activation or actuating sequence of said at least a first command (3), preferably on the basis of a first and a second activation or actuating sequence of said at least a first command (3).

According to another non-limiting aspect, after the activation of said self-learning operating configuration said data processing unit (2) determines a storage, in said memory, of a dispensing datum corresponding to said user-customized dispensing volume of conditioned water or fluid and/or to said user-customized dispensing time of conditioned water or fluid, optionally after of said predefined activation or actuating sequence of said at least a first command (3), preferably after of the first and of the second activation or actuating sequence of said at least a first command (3).

According to another non-limiting aspect, in said operating configuration of dispensing said predefined activation or actuating sequence of said at least a first command (3) determines an automatic loading, from said memory, of said dispensing data corresponding to said customized dispensing volume of conditioned water or fluid and/or to said customized dispensing time of conditioned water or fluid.

According to another non-limiting aspect, the method comprises, in said operating configuration of dispensing, a dispensing of conditioned water or fluid from said outlet (16) for a volume and/or time corresponding to the customized dispensing volume of conditioned water or fluid and/or to the water dispensing time of said dispensing data.

According to the present disclosure is furthermore described a method for controlling a faucet (10) having a plurality of inlets (12-15) configured for being connected with a respective plurality of sources of conditioned water or fluid (22-25), wherein the method comprises:

a self-learning operating configuration, wherein a data processing unit (2) of an electronic device (1) for controlling said faucet (10) operatively associated to at least a first command (3), when the first command (3) is activated in a first combination of actuation, memorizes in an automatic way, through a first associative datum (30), a first configuration of supply of an outlet (16) of said faucet (10) with water coming from a first selected inlet of the plurality of inlets (12-15) or from a first selected set of inlets of said plurality of inlets (12-15).

According to another non-limiting aspect, in said self-learning operating configuration, said data processing unit (2), when the first command (3) is activated in a second combination of activation, memorizes in an automatic way, through a second associative datum (30), a second configuration of supply of the outlet (16) of said faucet (10) with water coming from at least a second selected inlet of the plurality of inlets (12-15) or from a second selected set of inlets of said plurality of inlets (12-15).

According to another non-limiting aspect, the method comprises an activation of an operating configuration of dispensing, wherein when there is an activation of said first command (3) in said first combination of actuation, the data processing unit (2), loads from said memory said first associative datum (30), and causes a dispensing on said outlet (16) of water coming from said first selected inlet of said plurality of inlets (12-15) or from said first selected set of inlets of said plurality of inlets (12-15).

According to another non-limiting aspect, the method comprises an activation of an operating configuration of dispensing, wherein when there is an activation of said first command (3) in said second combination of activation, the data processing unit (2), loads from said memory said second associative datum (30), and causes a dispensing on said outlet (16) of water coming from said second selected inlet of said plurality of inlets (12-15) or from said second selected set of inlets of said plurality of inlets (12-15).

According to another non-limiting aspect, in the activation of an self-learning operating configuration the data processing unit (2), according to a connection of at least a second source of conditioned water or fluid (23) of said plurality of sources of conditioned water or fluid (22-25) to at least an inlet of said plurality of inlets (12-15), carries out automatically an enabling of at least a second combination of activation of said at least a first command (3).

According to another non-limiting aspect, the method comprises a loading from a memory operatively accessible to said data processing unit (2) of a second associative datum (30') identifying a univocal association between said second inlet or said second set of inlets and said second source of conditioned water or fluid (23).

According to another non-limiting aspect, said first combination of actuation is specifically destined to allow, in use, a second configuration of supply of said outlet (16) by means of water coming from at least said second selected inlet of said plurality of inlets (12-15) or from said second selected set of inlets of said plurality of inlets (12-15), according to said first associative datum (30).

According to another non-limiting aspect, at the activation of said operating configuration of dispensing, when there is an activation of said first command (3) in said second combination of activation, the data processing unit (2), loads from said memory said second associative datum (30').

According to another non-limiting aspect, at the activation of said operating configuration of dispensing, when there is an activation of said first command (3) in said second combination of activation, the data processing unit (2) causes a dispensing on said outlet (16) of water coming from said second selected inlet of said plurality of inlets (12-15) or from said second selected set of inlets of said plurality of inlets (12-15).

According to another non-limiting aspect, in the operating configuration of dispensing said data processing unit (2), when there is an activation of said at least a first command (3) in said first or said second combination of activation, carries out a transmission of at least one among a signal of activation toward said first source of conditioned water or fluid (22) or said second source of conditioned water or fluid (23) and a signal of opening of at least a valve (18) operatively associated to one of the inlets of the plurality of inlets (12-15) for determining the supply of the outlet (16) of the faucet (10) through water coming from said first selected inlet or from said first selected set of inlets or, respectively, from said second selected inlet or from said second selected set of inlets.

According to another non-limiting aspect, the method comprises the activation of said command comprises the activation of at least a first and a second button of said command (3).

According to another non-limiting aspect, the method comprises the activation of at least a rotatable and/or translatable controller of said command (3).

According to another non-limiting aspect, the method comprises the interaction with at least a monitor (3*m*) of said command (3).

According to another non-limiting aspect, said monitor (3*m*) is operatively connected with said first and/or second button and/or with said at least a rotatable and/or translatable controller.

According to another non-limiting aspect, said first and/or said second combination of activation comprises a rotation and/or translation of said rotatable and/or translatable controller.

According to another non-limiting aspect, the activation of said at least a first command (3) in said first or second combination of activation determines a transmission of a first and of a second signal (S1, S2) to said at least a monitor (3*m*).

According to another non-limiting aspect, in said self-learning operating configuration said data processing unit (2) transmits at least an instruction signal (S3) to said monitor (3*m*).

According to another non-limiting aspect, said first and/or said second combination of actuation comprises an activation of at least a ring (3*g*) of said rotatable and/or translatable controller.

According to another non-limiting aspect, said ring (3*g*) is clockwise or anti-clockwise rotatable and/or translatable along at least a predefined axis (X, Y, Z), preferably along at least a translation axis parallel to a rotation axis (X) of the ring and/or along at least a first axis (Y), and optionally a second axis (Z).

According to another non-limiting aspect, at least one among said first axis and said second axis is orthogonal to a rotation axis (X) of the ring (3*g*).

According to another non-limiting aspect, at least a between said first and said second combination of actuation comprises a composite movement of rototranslation of said ring (3*g*).

According to another non-limiting aspect, said ring rotatable and/or translatable has at least a rest and stable position and an unstable position.

According to another non-limiting aspect, said composite movement determines a movement of said ring from said rest and stable position to said unstable position.

According to another non-limiting aspect, at least one among said first or second signal (S1, S2) comprises at least one datum indicative of a conditioning of the water dispensed through the outlet (16) of the faucet (10), in particular one datum indicative of a temperature, and/or gasifying and/or filtration of the water dispensed through the outlet (16) of the faucet (10).

According to another non-limiting aspect, at least one among said first or second signal causes a time-variant graphical representation on said monitor.

According to another non-limiting aspect, at least one among said first or second signal contains an identifying datum of a source of conditioned water or fluid (22-25) operatively connected to said at least an inlet (12-15).

According to another non-limiting aspect, at least one among said first or said second signal causes a temporary activation of a vibration or sound unit (3*v*) of said electronic device (1).

According to another non-limiting aspect, in said operating configuration of dispensing, an activation of said at least a first command (3) in said first combination of actuation and/or in said second combination of actuation determines, through said data processing unit (2) and in an automatic way, a loading of said first associative datum (30) or of said second associative datum (30').

According to another non-limiting aspect, in said operating configuration of dispensing, an activation of said at least a first command (3) in said first combination of actuation and/or in said second combination of actuation determines, through said data processing unit (2) and in an automatic way, a dispensing on said outlet (16) of a predefined amount of water defined on a volume and/or time basis.

According to another non-limiting aspect, the method comprises the activation of a voice activation module of said at least a first command (3).

According to another non-limiting aspect, said first combination of actuation and/or said second combination of actuation is a combination of activation at least partially by voice.

According to another non-limiting aspect, the method comprises a transmission of a control signal from said data processing unit (2) toward a source of conditioned water or fluid (22-25).

According to another non-limiting aspect, the method comprises the activation and/or the maintenance in an active state, of a sensor of the electronic device (1) and/or of the faucet (10), said sensor being configured for transmitting a signal toward the data processing unit (2), said signal being indicative of a feature of said conditioned water or fluid.

According to another non-limiting aspect, the method comprises a step of comparison performed by the data processing unit (2); in said step of comparison said data processing unit (2) compares said signal with the range selected of values or with the threshold and, when the conditions of exceeding of the threshold or the outlet from the range selected of values by said signal occur, the data processing unit (2) determines a transmission of an alarm message, and/or determines an automatic, and preferably immediate, interruption of the dispensing of the conditioned water or fluid from the outlet (16).

According to another non-limiting aspect, the feature of said conditioned water or fluid comprises at least one among: a temperature, a pressure, a determined presence or quantity of one or more chemical or mineral substances, bacteria or viruses.

According to another non-limiting aspect, said control signal is specifically destined to put said at least a source of conditioned water or fluid (22-25) in a condition of low energy consumption and/or to deactivate an operational functioning of said source of conditioned water or fluid for a predetermined period of time.

According to another non-limiting aspect, said control signal is transmitted from said data processing unit (2) at an activation of said at least a command (3).

According to the present disclosure is described a use of the electronic device (1) and/or of the faucet (10) for dispensing conditioned water and/or a fluid, in particular a fluid destined to be drunk.

According to another non-limiting aspect, said fluid comprises one or more of the elements of the following list: wine, beer and their by-products, spirits, fruit juices, vegetable juices, fruit or vegetable smoothies, milk, yoghurt or by-products, creams, oils, vinegars of wine and of fruit, drinks added with proteins and/or vitamins.

According to the present disclosure is described a use of the electronic device (1) and/or of the faucet (10) for domestic applications, preferably in the kitchen.

FIGURES

Some embodiments of the object of the present disclosure are described herein below; the following detailed description refers to the attached figures, a brief description of which is provided herein below.

DETAILED DESCRIPTION

Figure 1:
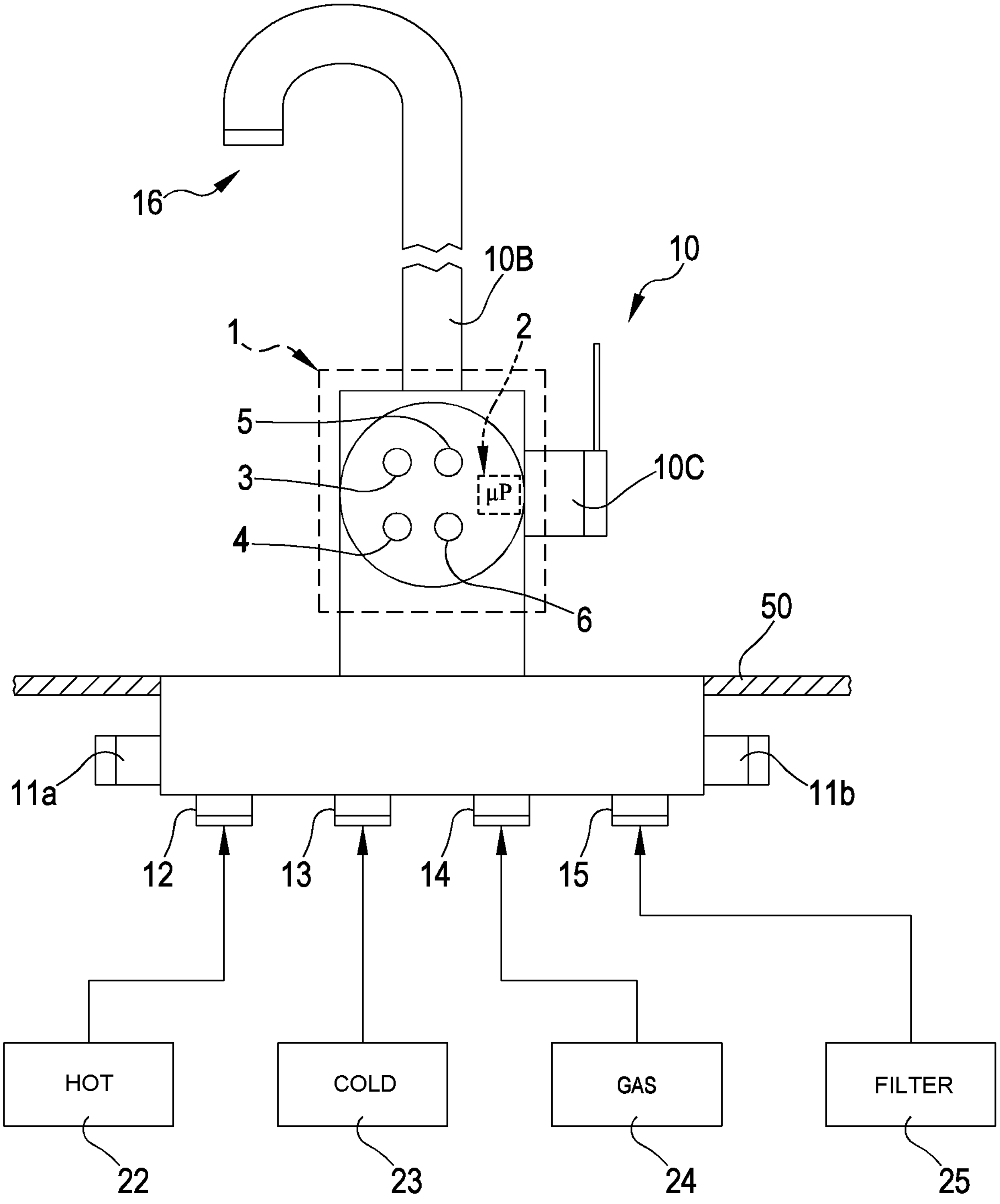
FIG. 1 shows a faucet according to the present disclosure, in a schematical and non-limiting embodiment; the faucet is provided with an electronic device for controlling the dispensing of water from one or more sources of conditioned water or fluid.

The present disclosure refers to an electronic device 1 suitable for being associated to a faucet 10, in particular configured for being operatively connected with, or be part of, a faucet 10; also the present disclosure refers to a method of coupling between a faucet 10, and/or the electronic device 1, and one or more sources of conditioned water or fluid. Also the present disclosure refers to a method for controlling a faucet. The present disclosure also relates to an electronic faucet. In the following detailed description there will be not always an explicit differentiated reference to the specific configuration of the electronic device 1 and/or of the faucet 10 with respect to the method carried out by them (or with them). It is understood that where the faucet 10 and/or the electronic device 1 has determined technical characteristics or can be actuated in a determined manner, it will be clear that a corresponding embodiment method of the faucet 10 and/or of the electronic device 1, a corresponding method of coupling with a source of conditioned water or fluid and/or a corresponding controlling method for the faucet 10 shall be considered also disclosed.

For the purposes of the present disclosure, with fluid it is intended a drinkable fluid, preferably a fluid comprising one or more of the elements of the following list: wine, beer and their by-products, spirits, fruit juices, vegetable juices, fruit or vegetable smoothies, milk, yoghurt or by-products, creams, oils, vinegars of wine and of fruit, drinks added with proteins and/or vitamins.

The faucet 10 according to the present disclosure comprises a body 10B, an outlet 16 for water dispensing and at least a module 100*a* (connection module) having a plurality of inlets 12-15. In the embodiment the inlets are four, but this number is not to be intended in a limiting way. The module 100*a* is preferably arranged under the top 50 of the kitchen or of the sink and/or is configured for being hidden from the user's view in normal use of the faucet.

The module 100*a* can be integral with the body 10B of the faucet 10 or separated from it, in particular being a connection module 100*a* destined a be specifically installed and coupled on the body 10B of the faucet 10.

The inlets 12-15 are hydraulic inlets, which can be alternatively, or in combination, connected with the outlet 16 through an opportune command which will be better described in the following.

A dispensing command 10C is also present, and is coupled to the body 10B. This dispensing command 10C allows to vary the flow rate of the flow on the outlet 16 and/or allows to vary the temperature of the water produced on the outlet 16.

The dispensing command 10C can be installed on the body 10B of the faucet, as in the case of the attached figured, or can be installed in a position separate with respect to the body of the faucet 10. Some embodiments of the faucet 10 can comprise a first and a second dispensing command 10C; in this case, the first and the second dispensing command 10C can be installed in correspondence of the body 10B of the faucet 10 or at least one among the first command and the second dispensing command 10C can be installed in position separated with respect to the body of the faucet 10.

The faucet 10 comprises also a first operating inlet 11*a* for hot water and a second operating inlet 11*b* for cold water, of traditional type; the mixing of the water coming from said two inlets is traditionally controlled by the dispensing command 10C. Alternatively, the first and the second operating inlet 11*a*, 11*b* can be installed on the connection module 100*a*. The hot water and the cold water supplied on the first and on the second operating inlet 11*a*, 11*b* is supplied from a distribution network which preferably is a domestic distribution network.

To each of the inlets 12-15 is connected a respective source of conditioned water or fluid. The sources of conditioned water or fluid are indicated in the attached figures with the numerical references 22, 23, 24, 25. In the attached figures the sources of conditioned water or fluid are four, but this number should not be intended in a limiting way.

In an embodiment the inlets 12-15 are all provided with a same type of connector. In this embodiment, then, it is not possible to identify a precise destination of connection between a selected inlet and a specific source.

Generally the plurality of inlets 12-15 comprises equal inlets, equal in size and/or shape and/or color and/or conformation. In an embodiment each inlet of the plurality of inlets 12-15 is provided with an inlet with a screw inlet.

A first source of conditioned water or fluid 22 is for example a source of hot water, preferably configured for dispensing water at a temperature close to the boiling temperature, then at about 100° C.

A second source of conditioned water or fluid 23 is for example a source of cold water, preferably configured for dispensing water at a temperature close to the freezing temperature, for example water at about 5° C.

A third source of conditioned water or fluid 24 is for example a source of sparkling water, preferably configured for dispensing water added with carbon dioxide. This third source comprises a carbon dioxide adder. Conveniently, the carbon dioxide adder comprises a pressurized bottle, replaceable, for a controlled addition of carbon dioxide to the water dispensed through the outlet 16.

A fourth source of conditioned water or fluid 25 is for example a source of filtered water, preferably configured for dispensing water free of minerals and/or contaminants by means of a process of mechanical and/or chemical filtration.

Figure 2:
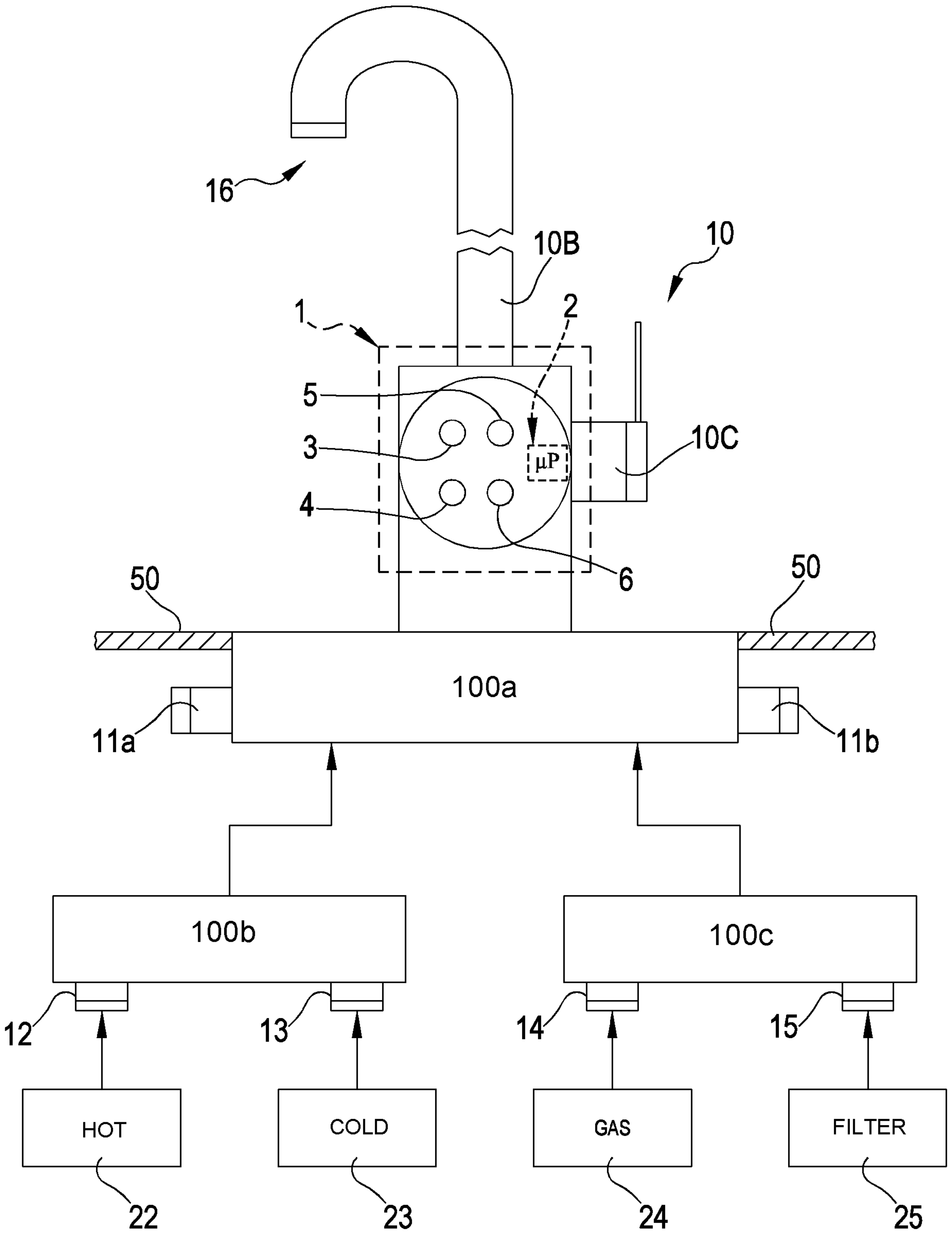
FIG. 2 shows an alternative embodiment of the faucet according to the present disclosure.

In FIG. 2 is shown an alternative embodiment of the faucet 10 wherein the plurality of inlets 12-15 is installed on a plurality of connection modules 100*a*, 100*b*, 100*c*, and at least part of these connection modules is separable and configurable in a modular way on the body of the faucet 10. Also the connection modules 100*a*, 100*b*, 100*c* are destined to be installed under the top 50 of the kitchen or of the sink and/or are destined to be hidden from the user's view in normal use of the faucet.

In particular the non-limiting embodiment shown in FIG. 2 shows an embodiment wherein to the body 10B of the faucet 10 is connected in a direct way a first connection module 100*a* housing the first and the second operating inlet 11*a*, 11*b*; the second connection module 100*b* houses the first and the second inlet 12, 13, and the third connection module 100*c* houses the third and the fourth inlet 14, 15. Each one among the second connection module 100*b* and the third connection module 100*c* comprises an outlet connected with an inlet of inter-modular connection of the first connection module 100*a*.

Through this configuration is then generally possible to realize a step of connection of at least one, preferably a plurality of, connection modules 100*a*, 100*b*, 100*c* for the inlet of conditioned water or fluid to the body of the faucet 10, in such a way that at least part of the inlets of the plurality of inlets 12-15 is arranged on the plurality of connection modules 100*a*, 100*b*, 100*c*; optionally in such a way that at least a first part of the plurality of inlets 12-15 is arranged on each module of the plurality of connection modules 100*a*, 100*b*, 100*c* and a second part of the plurality of inlets 12-15 is directly connected to the body 10B of the faucet 10.

At least one of the modules of the plurality of connection modules 100*a*, 100*b*, 100*c* is configured and specifically destined to be connected to an inlet of another connection module 100*a*, 100*b*, 100*c* for the inlet of conditioned water or fluid or to one of the inlets of the second part of the plurality of inlets 12-15.

The faucet 10 object of the present disclosure is then configured for allowing the modular connection of one or more of the sources of conditioned water or fluid 22-25 to a respective inlet selected, in particular randomly, between the plurality of inlets 12-15.

As it will be better clarified in the following portion of the description, each of the sources of conditioned water or fluid 22-25 is configured for, and specifically destined to, transmitting at least an own univocal identifying code, which in particular allows to distinguish it from the other sources. Different configurations of sources of conditioned water or fluid 22-25 have been conceived, some capable of transmitting this univocal identifying code on a wired data channel, of dedicated or common type (data bus) and/or on a wireless data channel.

Said at least its own univocal identifying code is transmitted by means of a signal S of electromagnetic type.

If the sources of conditioned water or fluid 22-25 are configured for transmitting the univocal identifying code on a wired data channel, each of the sources of conditioned water or fluid 22-25 will be provided with its own data connector which allows the exchange of signals of an electrical and/or optical nature with the electronic device 1. In an embodiment, each of the sources of conditioned water or fluid 22-25 can optionally be provided with a button suitable for allowing the pairing (pair) in the mode herein described below.

The faucet 10 is configured for carrying out at least partially in an automatic way a identifying process of the source of conditioned water or fluid 22-25 and for allowing a logical association between a respective inlet of the plurality of inlets 12-15 and a selected source of the plurality of sources of conditioned water or fluid 22-25, so that through a command the dispensing of water through one or more of the sources of conditioned water or fluid 22-25 can be recalled without requesting the operator that carries out the installation of the faucet 10 to take care to connect in a specific way a determined source of conditioned water or fluid to a specific inlet 12-15. For this reason, the faucet herein described can be defined as smart faucet. In an embodiment, the operator which carries out the connection, can connect even randomly each source of the plurality of sources of conditioned water or fluid 22-25 on a respective inlet and start, or anyway wait for the completion of, a procedure of self-configuration after which the faucet 10 will have univocally correctly attributed the assignation between the command, and the opening of the valve of the correct inlet or of the correct inlets 12-15 corresponding to the specific and correct source of conditioned water or fluid 22-25 for that command, or the sending of a dispensing command toward the specific and correct source of conditioned water or fluid 22-25 for the specific control sequence.

The faucet 10 is conceived with the aim of simplifying the connection of the various sources of conditioned water or fluid 22-25 to the respective inlets 12-15, even if these inlets are aesthetically similar or even identical, preventing connection errors which could occur with the faucets according to the known art, because through a procedure of electronic association, carried out through a data processing unit, the selection of which specific inlet between the plurality of inlets present on the faucet is selected through a command is configured according to a procedure at least partially automated.

Thanks to this technical feature, it is not only no longer necessary to have a specific graphic and/or dimensional coding of each of the inlets 12-15, but it is also possible to use any one of the inlets of the faucet for connecting to any of the sources of conditioned water or fluid 22-25. For this reason, even the flexibility of relative positioning existing between the faucet 10 itself and the sources of conditioned water or fluid 22-25 in relation to the position and/or orientation of the inlets 12-15 is improved.

For allowing this technical function the faucet 10 is provided with an electronic device 1 which comprises at least a command 3, preferably a plurality of commands 3-5, for allowing the selection of which, among the sources of conditioned water or fluid 22-25, using for the dispensing toward the outlet 16 of the faucet 10.

The electronic device 1 comprises a data processing unit 2 configured for receiving in input at least an identifying signal S of at least a first source of conditioned water or fluid 22, in use connected on a first inlet 12 of the plurality of inlets 12-15 of the faucet 10. The data processing unit 2 is configured for storing in a way at least partially automated a logical association 30 between the at least a first source of conditioned water or fluid 22 and the first inlet 12 of the plurality of inlets 12-15.

The data processing unit 2 can comprise a processor of general purpose type on which a predefined software program is executed, or can be supplied of a dedicated processor, and/or an AISC, and/or a small FPGA for carrying out the activities described in the present disclosure. Associated to the data processing unit 2, a memory, preferably non-volatile, contains data and/or the software program, necessary to execute the activities described in the present disclosure.

The software program comprises portions of code which can be written in any programming language. These portions of code, when executed, determine the execution of one or more of the steps of a method of coupling between a source of conditioned water or fluid and a faucet herein described and/or determine the execution of the method for controlling the faucet herein described.

The electronic device 1 can be configured for being operatively paired to a faucet 10, and can then be product or sold as a stand-alone device with respect to the faucet 10 itself. In an alternative embodiment, the faucet 10 comprises the electronic device 1, which is therefore an integral part of the faucet itself. Although an integral part, the faucet 10 and the electronic device 1 can be two distinct bodies.

The Applicant has conceived different embodiments of the electronic device 1, and then of the faucet 10, which will be discussed in detail herein below.

A first embodiment of the electronic device 1 is supplied of a data bus 43, operatively connected with the data processing unit 2 and in particular electrically connected with the data processing unit 2. On the data bus 43 are transmitted and received electronic data in form of an identifying signal S of one or more of the sources of conditioned water or fluid 22-25. In an embodiment, the data bus 43 is a data bus of serial type.

The data processing unit 2 carries out therefore an electronic procedure of reading of data transmitted on the data bus 43. It is noted that in particular the data bus 43 is bidirectional, and allows therefore both the reception of the data transmitted by the sources of conditioned water or fluid 22-25, and the transmission of data toward the sources of conditioned water or fluid 22-25 themselves.

Figure 3:
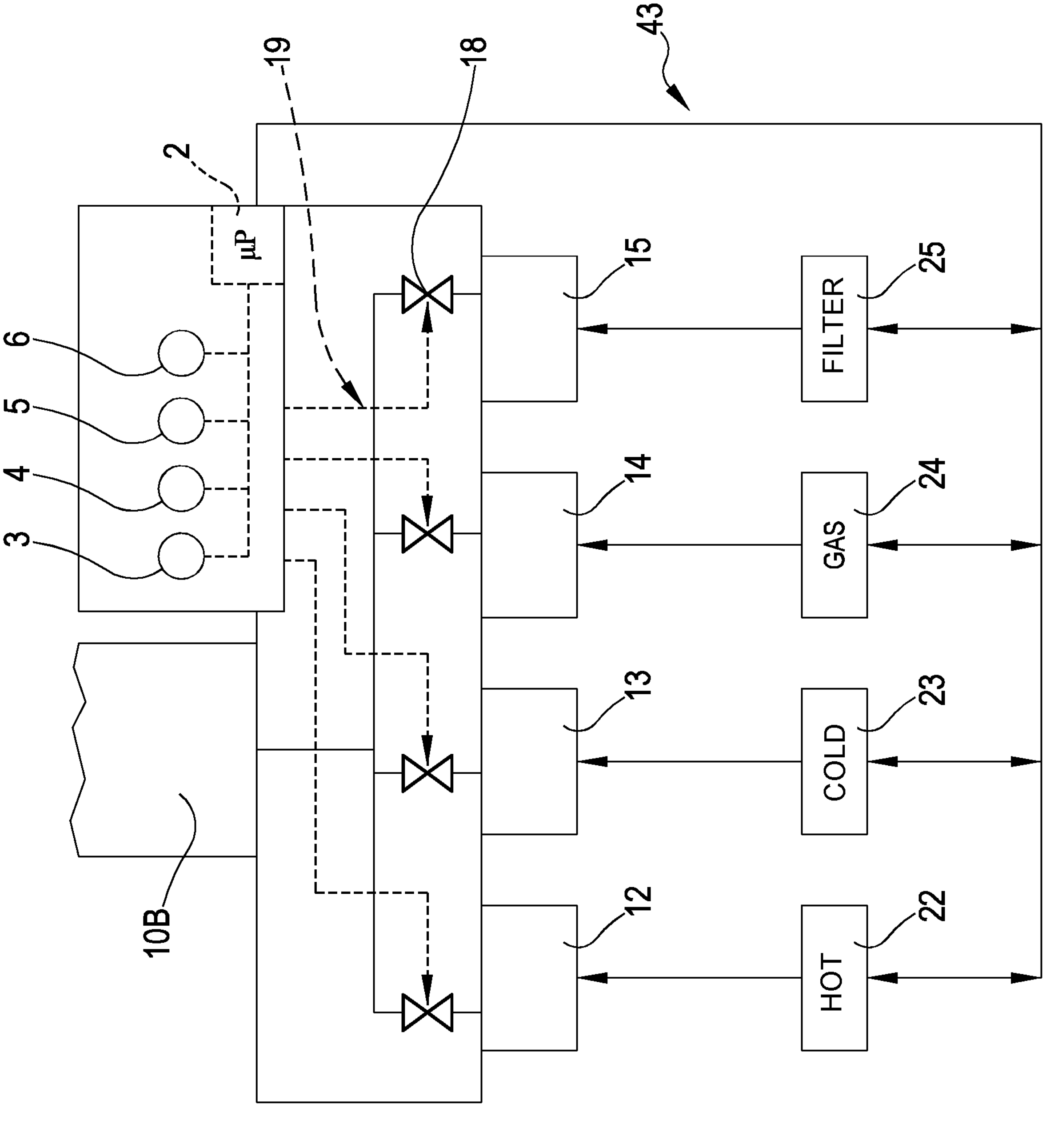
FIG. 3 shows schematically a first embodiment of the faucet object of the present disclosure, wherein the electronic device comprises a data bus for the transmission of data of identification and/or control of one or more sources of conditioned water or fluid.

As shown in FIG. 3, a particular embodiment of the data bus 43 is represented by a data bus of serial type, preferably of half-duplex type. In a non-limiting embodiment, the data bus 43 operates according to the standard EIA RS 485. EIA RS 485 identifies a specific ISO/OSI on a physical level for serial data transmission, of half-duplex and multipoint type.

Each of the sources of conditioned water or fluid 22-25 is provided with a respective connector for transmitting data on the data bus 43. This connector can be for example and non-limiting thereto a 5-pin connector and/or a tray connector. Each of the sources of conditioned water or fluid 22-25 is configured for transmitting on the data bus 43 an identifying signal S, which distinguish it with respect to the other sources of conditioned water or fluid which transmit on the data bus 43.

An operation of pairing is executed for allowing storing the logical association between a specific source of conditioned water or fluid 22-25 and a specific inlet 12-15. This pairing operation represents an operating configuration of association, better described below, which can be activated for example through a particular combination of activation of the command present on the faucet 10 or through an external computer operatively associated to the electronic device 1 herein described.

The electronic device 1 is put in a particular operating configuration of association thanks to which the data processing unit 2 is put into a configuration that allows to "listen" on the data bus 43 quale between the sources of conditioned water or fluid 22-25 is transmitting an own identification code.

In this operating configuration, through the command 3, is selected an appropriate inlet between the plurality of inlets 12-15. For example this appropriate inlet is the first inlet 12. Therefore the data processing unit 2 knows that it is "hearing" the sending of an identifying signal S of a source of conditioned water or fluid 22-25 which is connected on the determined inlet between the plurality of inlets 12-15, for example the first inlet 12. Then in this case the operator connects the source of conditioned water or fluid 22 on the first inlet 12 and puts the electronic device 1 in an operating configuration wherein it will remain, through the data bus 43, listening to an identifying signal S of a source of conditioned water or fluid 22-25 (for example, a "hot" identifying signal S, then associated according to the examples of the figures attached to the first source of conditioned water or fluid 22) which will be logically associated to the first inlet 12.

When the "hot" identifying signal S is received by the data processing unit 2, this data processing unit 2 memorizes the "hot" identifying signal S as an identifying signal associated to the first inlet 12. In this way the electronic device 1 will know which on the first inlet 12 is connected the first source of conditioned water or fluid 22.

In this operating configuration, always through the command 3 or through a second command 4, is selected an appropriate inlet between the plurality of inlets 12-15. For example this inlet is the second inlet 13. Therefore the data processing unit 2 knows that it is "hearing" the sending of an identifying signal S of a source of conditioned water or fluid 22-25 which is connected on the determined inlet between the plurality of inlets 12-15, for example the second inlet 13. Then, in this case the operator connects the source of conditioned water or fluid 23 on the second inlet 13 and puts the electronic device 1 in an operating configuration wherein it will remain listening to, through the data bus 43, an identifying signal S of a source of conditioned water or fluid 22-25 (for example, a "cold" identifying signal S, indicative of the second source of conditioned water or fluid 23, in the examples of the figures) which will be logically associated to the second inlet 13.

When the "cold" identifying signal S is received by the data processing unit 2, this data processing unit 2 memorizes the "cold" identifying signal S come identifying signal associated to the second inlet 13. In this way the electronic device 1 will know which on the second inlet 13 is connected the second source of conditioned water or fluid 23.

The sequence proceeds with the remaining sources of conditioned water or fluid in a similar way; the sequence is therefore not repeated herein.

Figure 4:
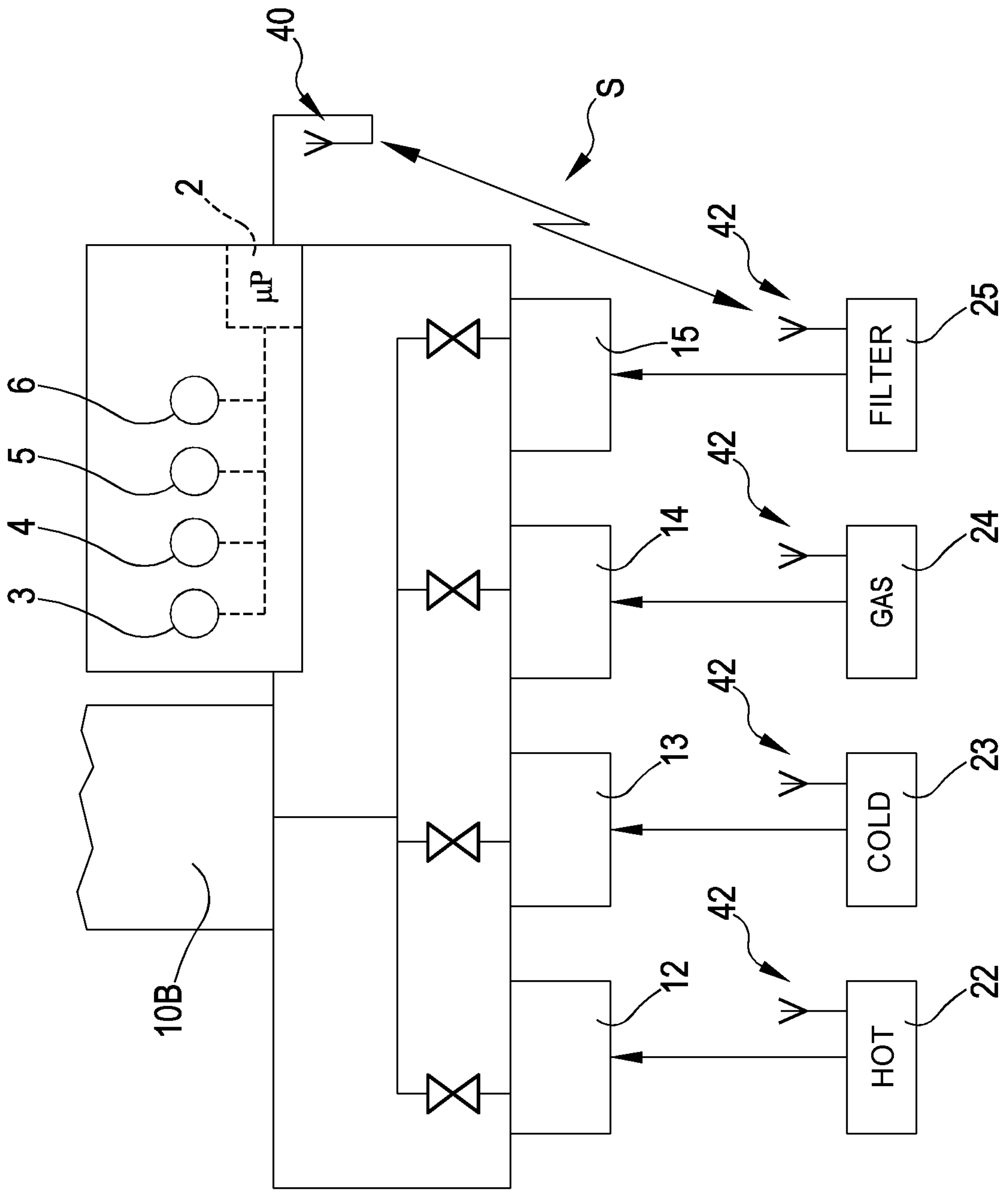
FIG. 4 shows schematically a second embodiment of the faucet object of the present disclosure, wherein the electronic device comprises a wireless channel for the transmission of data of identification and/or control of one or more sources of conditioned water or fluid.

A second embodiment of the electronic device 1 object of the present disclosure is provided with a data processing unit 2 which is connected with, or integrates, a wireless electronic transceiver module in turn connected with an antenna 40. This second embodiment is represented in FIG. 4.

Each of the sources of conditioned water or fluid 22-25 is provided with a respective wireless transmission module, in turn connected with a respective antenna 42.

The process of operating configuration of association is similar to the one described above, but unlike the previous case, the bus 43 is replaced by a wireless channel.

Also in this case the electronic device 1 is put in a particular operating configuration of association thanks to which the data processing unit 2 is put into a configuration that allows to "listen" on the wireless channel which, between the sources of conditioned water or fluid 22-25, is transmitting its identification code.

In this operating configuration, through the command 3, is selected an appropriate inlet between the plurality of inlets 12-15. For example this appropriate inlet is the first inlet 12. Therefore the data processing unit 2 knows that it is "hearing" the sending of an identifying signal S of a source of conditioned water or fluid 22-25 which is connected on the determined inlet between the plurality of inlets 12-15, for example the first inlet 12. Then in this case the operator connects the source of conditioned water or fluid 22 on the first inlet 12 and puts the electronic device 1 in an operating configuration wherein it will remain, through the wireless channel and with the respective antenna 40, listening to an identifying signal S of a source of conditioned water or fluid 22-25 (for example, a "hot" identifying signal S) which will be logically associated to the first inlet 12.

When the "hot" identifying signal S is received by the data processing unit 2, this data processing unit 2 memorizes the "hot" identifying signal S as an identifying signal associated to the first inlet 12. In this way the electronic device 1 will know which on the first inlet 12 is connected the first source of conditioned water or fluid 22.

In this operating configuration, always through the command 3 or through a second command 4, is selected an appropriate inlet between the plurality of inlets 12-15. For example this appropriate inlet is the second inlet 13. Therefore the data processing unit 2 knows that it is "hearing" the sending of an identifying signal S of a source of conditioned water or fluid 22-25 which is connected on the determined inlet between the plurality of inlets 12-15, for example the second inlet 13. Then in this case the operator connects the source of conditioned water or fluid 23 on the second inlet 13 and puts the electronic device 1 in an operating configuration wherein it will remain, through the wireless channel and with the respective antenna 40, listening to an identifying signal S of a source of conditioned water or fluid 22-25 (for example, a "cold" identifying signal S) which will be logically associated to the second inlet 13.

When the "cold" identifying signal S is received from the data processing unit 2, this data processing unit 2 memorizes the "cold" identifying signal S as identifying signal associated to the second inlet 13. In this way the electronic device 1 will know which on the second inlet 13 is connected the second source of conditioned water or fluid 23.

Figure 5:
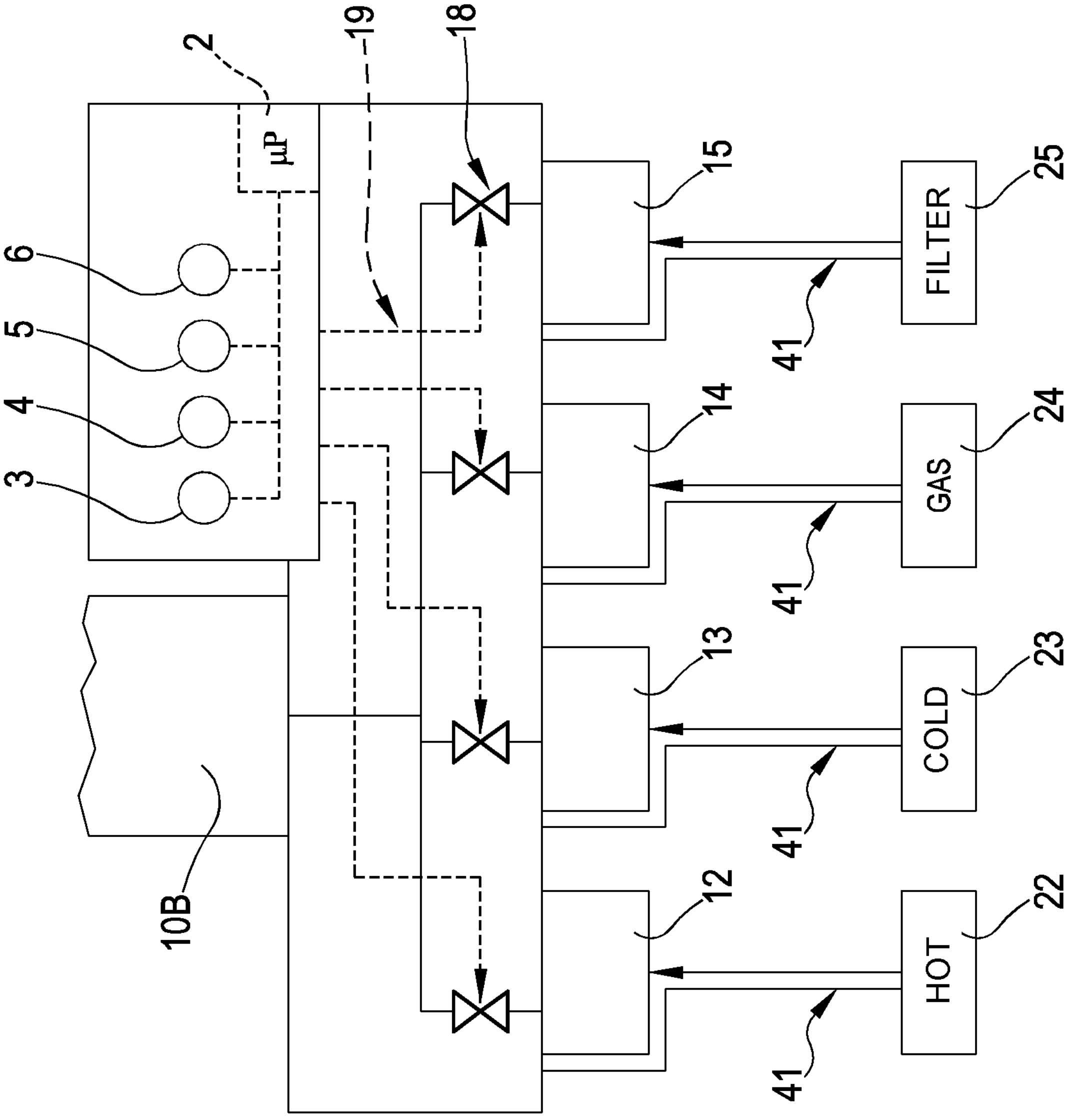
FIG. 5 shows schematically a third embodiment of the faucet object of the present disclosure, wherein the electronic device comprises a plurality of data lines each operatively associated to a respective hydraulic inlet suitable for being connected with a respective source of conditioned water or fluid.

Another embodiment of the electronic device 1 and then of the faucet 10 is furthermore represented in FIG. 5. In this embodiment, there is the presence of a dedicated data channel, specific for each source of conditioned water or fluid 22-25. This data channel is wired and on this channel data move signals of electrical and/or optical nature. A plurality of inlets data 41 is present on the electronic device 1. The number of inlets data 41 is equal to the number of inlets 12-15 of the faucet and each of the inlets data 41 is operatively and univocally pre-associated to a specific inlet between the inlets of the mentioned plurality of inlets 12-15.

In this specific embodiment is sufficient that each source of conditioned water or fluid 22-25 transmits its own identifying signal S without prior need for the selection of a specific inlet 12-15.

In this specific embodiment, in the operating configuration of association, is sufficient that the operator proceeds with the connection for example of the first source of conditioned water or fluid 22 with the first inlet 12 and with the connector of the first source of conditioned water or fluid 22 to the data line 41, in particular the inlet data 41, associated to the first inlet 12 for causing that on this inlet data 41 is transmitted an identifying signal S of the first source of conditioned water or fluid 12 such as to allow the storage in a substantially automated way of the logical association of the first inlet 12 with the first source of conditioned water or fluid 22.

Figure 6:
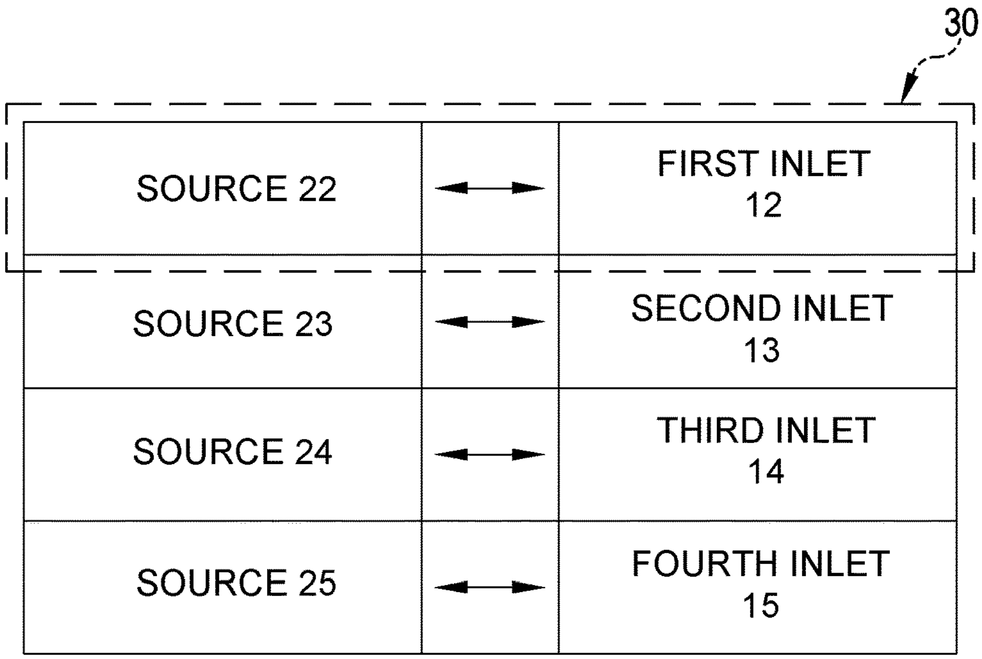
FIG. 6 shows a principle diagram of logical associations existing between a plurality of sources of conditioned water or fluid and a plurality of inlets of the faucet.

FIG. 6 shows a schematic representation of an association stored inside the memory operatively accessible from the data processing unit 2; having four inlets and four sources of conditioned water or fluid, in the memory is present a table of at least two columns and four rows, each row identifying a logical association between an inlet and a specific source of conditioned water or fluid. This table is conveniently recalled at a dispensing of a particular typology of conditioned water or fluid.

Applicant has conceived a specific embodiment wherein the connector related to each of the inlets 12-15 embeds also the related data input 41. In this case, in use, the physical water connection of the first source of conditioned water or fluid 22-25, and consequently of the remaining sources of conditioned water or fluid 23-25, determines automatically the connection of the source with the data line 41, in particular with the data input 41.

Figure 7:
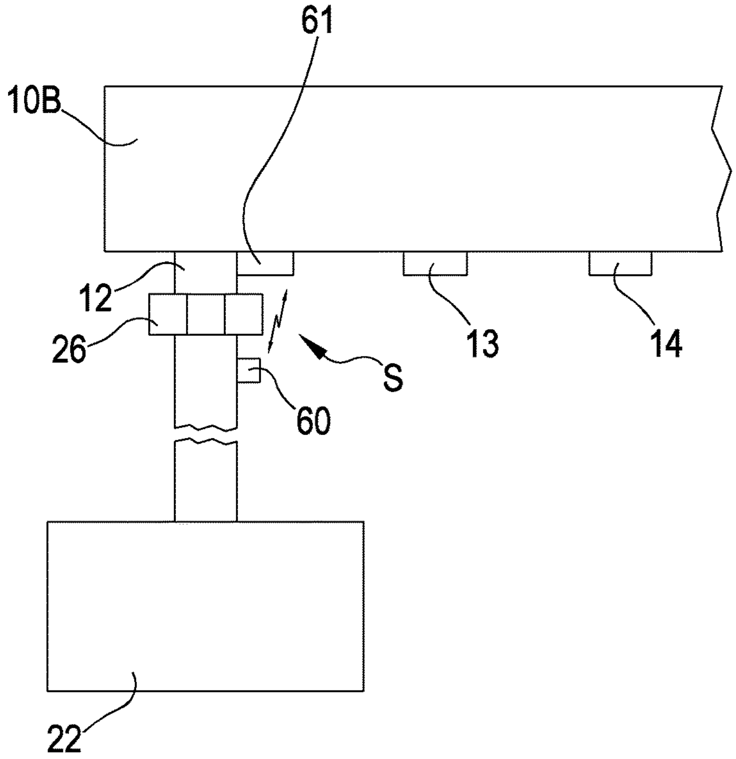
FIG. 7 shows a schematic representation of a specific embodiment of the faucet object of the present disclosure wherein a reader of tag RFid is positioned in substantial correspondence of an inlet and is destined to the reading of a tag RFid of the source of conditioned water or fluid.

As shown in FIG. 7, another embodiment of the electronic device 1 and, then, of the faucet 10, is such that in substantial correspondence of each of the inlets 12-15 is provided a reader 61 of a wireless tag 60, for example a tag RFid, which allows the transmission of the identifying signal S of the specific source of conditioned water or fluid 22-25. In this case the wireless tag 60 can be arranged in correspondence of the hydraulic connector 26 of the source which, in use, is connected to one of the inlets 12-15, so that the approximation of the reader 61 and of the wireless tag 60 determines the possibility of reception, by the data processing unit 2, of said identifying signal S. Preferably, the reader 61 of tag RFid is positioned in substantial correspondence of the respective inlet 12-15. Through the tag RFid a wireless radio communication channel is realized over short or very short distances which advantageously allows the possibility of identifying the source of conditioned water or fluid 22-25 connected to the faucet 10 only if actually there is a connection with the hydraulic connector 26 (for example, as shown in FIG. 7, comprising a clamping nut). Therefore, false recognition of sources of conditioned water or fluid 22-25 simply placed in proximity (for example 5 or 6 meters) of the faucet is avoided.

Different types of tag RFid can be used, but in a specific embodiment the tag RFid is passive. The reader 61 emits a radio signal and the power of the radio frequency signal is sufficient to activate the microchip of the tag RFid providing the energy needed to reply to the reader 61, retransmitting to it a signal containing the information stored in the microchip. Substantially, then, thanks to the technical features described above, it is not necessary that the sources of conditioned water or fluid 22-25 have particular electronic "intelligence"; it is sufficient that they are capable of transmitting an identifying signal S.

To enable selective dispensing of water coming from one or more of the sources of conditioned water or fluid in a controlled way, as for example shown in FIGS. 3, 4 and 5, the body of the faucet 10 integrates a plurality of valves 18 (in figures with a number equal to four, then with a number equal to the number of inlets) each connected with a respective inlet 12-15. Each of these valves 18, alternatively to what is represented in figures, can be arranged on the respective source of conditioned water or fluid 22-25.

A control line 19 is supplied for determining an opening, a closing or a partialization of each of the valves 18, even independently of each other, according to the command 3-6 selected in use by the user. In use, on the control line 19 is provided a signal of activation of the valve 18; this signal of activation 18 is transmitted by the data processing unit 2.

Figure 8:
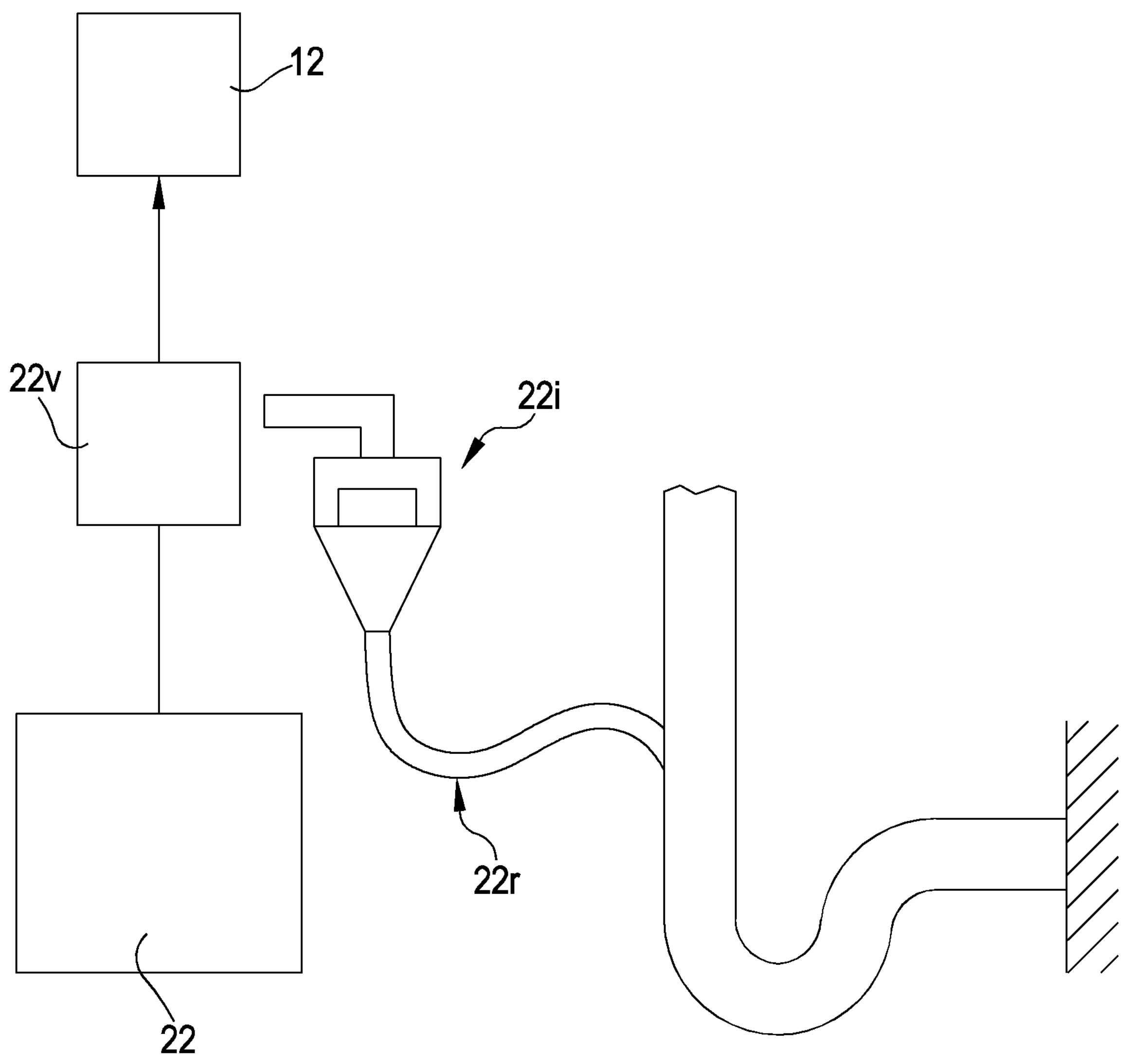
FIG. 8 shows a schematic representation of a hydraulic connection of a specific source of conditioned water or fluid.

As schematically shown in FIG. 8, it is noted that according to the practical point of view the first source of conditioned water or fluid 22 is not connected directly with an inlet 12-15 of the faucet 10; a safety valve **22*v* is interposed between the source and the inlet of the faucet. In turn the safety valve 22*v* is paired to an anti-reflux device 22*i* comprising, preferably, a free-venting funnel or equivalent device, which is connected, through a connection 22*r*, to a sewage outlet duct. The purpose of the free-venting funnel or equivalent device is to allow the escape of the water possibly refluent from the sewage outlet prior to the contamination of the line of the source of conditioned water or fluid. The free-venting funnel then allows the water escaping from the safety valve 22*v* to be directed towards the sewage outlet, but if it were to reflux from the sewage outlet directly towards the safety valve 22*v*, the free-venting funnel would allow the water from the sewage outlet to escape into the environment without contaminating the existing line between the source of conditioned water or fluid 22 and the inlet 12-15 of the faucet 110**. This line is in fact a line of clean or potable water, and must be safeguarded from contamination with dirty or non-potable water.

Figure 9:
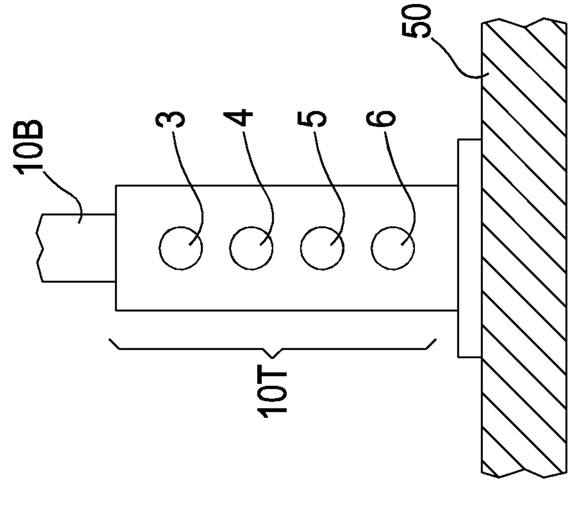
FIG. 9 shows a first and specific variant of a type of command of the electronic device installed on the faucet object of the present disclosure. This specific variant comprises a plurality of buttons.

FIG. 9 shows a first configuration of the faucet 10 wherein the plurality of commands 3-6 is in form of separated buttons, arranged on the body of the faucet 10 in a basis portion 10T of the body 10B which lies, in use, above a top 50 of the sink; each of the aforementioned separated buttons is electronically connected with the data processing unit 2.

Figure 10:
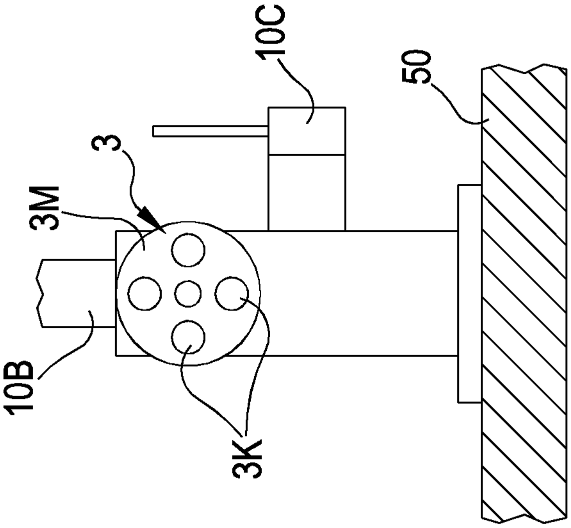
FIG. 10 shows a second and specific variant of a type of command of the electronic device installed on the faucet object of the present disclosure. This specific variant comprises a monitor.

FIG. 10 shows a second configuration of the faucet 10 wherein the command 3 is a digital command which has a monitor **3*m* from which can be made to appear a plurality of icons 3*k*. This command 3 conveniently, in alternative or in combination with the abovementioned monitor 3*m*, can have a rotatable and/or axially movable annular ring for allowing a selection and/or a confirmation of which between the sources of conditioned water or fluid 22-25 shall be selected for the dispensing from the outlet 16**.

Figure 11:
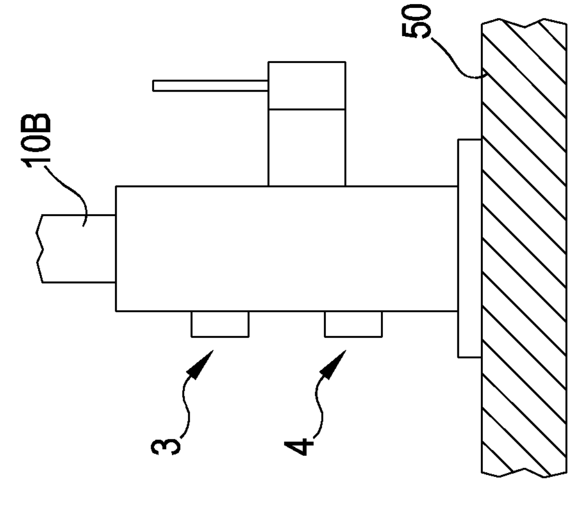
FIG. 11 shows a third and specific variant of a type of command of the electronic device installed on the faucet object of the present disclosure. This specific variant comprises a first and a second mechanical command.

FIG. 11 shows a third configuration of the faucet 10 provided with a first and a second command 3, 4 in form of a mechanical switch which act respectively on one or more of the valves 18 through the control line 19. Also in this case the first and the second command 3, 4 are operatively connected with the data processing unit 2.

Although in FIGS. 9, 10, 11 are shown embodiments wherein the command 3 or the plurality of commands 3-6 is integrated in the body of the faucet, this specific configuration shall not be intended in a limiting way; in fact, in a non-limiting embodiment, the command 3 or the plurality of commands 3-6 can be integrated in a command module separated with respect to the body of the faucet 10. This command module is destined a be installed above the top 50 of the sink or of the kitchen; alternatively, this command module is destined to be embedded in the top of the kitchen or of the sink. Therefore it seems clear that the present disclosure shows a command module and/or an electronic device which can be remoteised with respect to the body of the faucet 10.

The Applicant has conceived a particular embodiment of the electronic device 1 wherein the at least a command 3 is virtual, and is shown in the form of a software platform on an electronic portable device, for example a smartphone mobile phone. Alternatively, this command 3 is electronically accessed through the electronic portable device.

At the dispensing of a particular typology of water from a specific source of conditioned water or fluid, a second of the specific configuration of the faucet 10 can occur different situations.

In particular, when each of the sources of conditioned water or fluid 22-25 is always pressurized and/or ready to supply the inlet to which it is connected, is sufficient that at the selection of the dispensing with a specific association command-inlet, the valve 18 connected to the above-mentioned inlet is open, at least partially. If the valves 18 are arranged within the faucet 10, is not necessary to send any command of activation toward one of the sources of conditioned water or fluid 22-25.

If, on the other hand, the valves 18 are arranged in correspondence of each of the sources of conditioned water or fluid 22-25 and/or if, independently of the position of the valves 18, the source of conditioned water or fluid 22-25 shall be activated, an appropriate signal of activation is transmitted toward the interested source of conditioned water or fluid 22-25.

If the embodiment of the electronic device 1 and/or of the faucet 10 is such to imply the presence of the data bus 43, the signal of activation is operatively associated to an identifying signal of the source of conditioned water or fluid 22-25 of interest. In this way the source of conditioned water or fluid 22-25 can receive a signal which identifies it and downstream of this, be activated and/or determine the at least partial opening of the valve 18.

If the embodiment of the electronic device 1 and/or of the faucet 10 is such to imply the presence of a wireless transmission channel, also in this case the signal of activation is operatively associated to an identifying signal of the source of conditioned water or fluid 22-25 of interest.

If the embodiment of the electronic device 1 and/or of the faucet 10 is such to imply a data line 41, in particular at least an inlet data 41, selectively associated to each inlet, in this case it is not necessary to transmit the identified signal of the source of conditioned water or fluid 22-25 of interest, since the identification of the latter is already automatically realized through a procedure of selection, by the data processing unit 2, of the specific inlet data 41 of interest which is paired with the association command-source of conditioned water or fluid 22-25.

Figure 12:
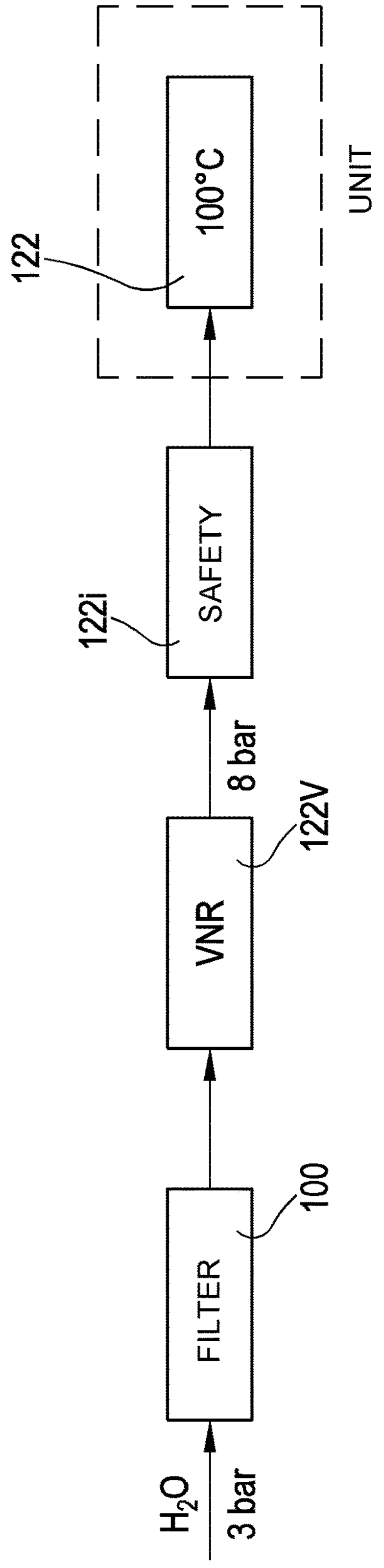
FIG. 12 shows a first configuration of a water supply system for a first particular source of conditioned water or fluid.
Figure 13:
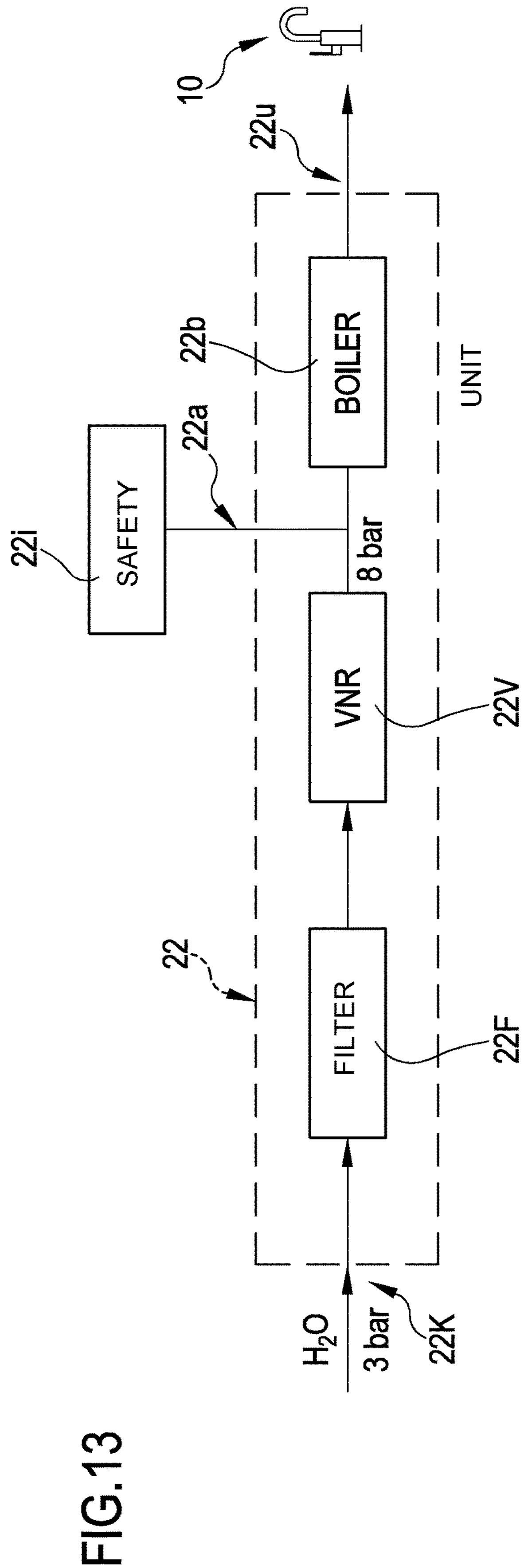
FIG. 13 shows a second configuration of a water supply system for a second particular source of conditioned water or fluid.

FIG. 12 shows in particular a configuration known for the supply of water to a source of conditioned water or fluid 122 configured for dispensing water at a temperature close to the boiling temperature. In the known art from a domestic supply line derives not filtered water at a first pressure P1, for example and non-limiting thereto P1=3 bar.

The water coming from the domestic supply line is at first filtered by a filter 100, for example a mechanical filter, and subsequently supplied to a safety valve **122*v*** which is a non-return valve.

The water exiting from the safety valve **122*v* is supplied toward a boiler 122 and is at a second pressure P2 higher with respect to P1. The second pressure P2 is for example 8 bar. Between the safety valve 122*v* and the boiler 122 is present an anti-reflux device 122*i*** for example comprising a free-venting funnel, which is connected with a sewage outlet duct. The purpose of the free-venting funnel is to allow the escape of the water possibly refluent from the sewage outlet prior to the contamination of the line of the source of conditioned water or fluid. More in particular, the black water which would flow back through the sewage duct would be dispersed into the environment without being able to flow back to the clean water line, which in this way remains free of contamination.

The boiler 122 is an electrically powered boiler, preferably through the traditional electrical distribution network a 240 Vac or, if destined to industrial applications, a three-phase 380 Vac.

The safety valve **122*v*, the boiler 122, the anti-reflux device 122*i* and the filter 100** are separated units, which shall be connected between them with an adequate number of connections.

The Applicant has conceived a particular embodiment of a source of conditioned water or fluid 22 configured for dispensing water at a temperature close to the boiling temperature which in a unique unit, i.e. in a single casing, integrates a filter **22*f*, a safety valve 22*v*, and a boiler 22*b***.

The unit comprises an inlet **22*k* that is supplied with unfiltered water supplied from a domestic supply line. The water is supplied at the inlet at a first pressure, for example P1**=3 bar.

The inlet **22*k* is directly connected with the filter 22*f*, which preferably but non-limiting thereto carries out a mechanical filtration of the water in order to remove macro particles and/or large amounts of minerals which could affect the operation of the boiler 22*b*. The outlet of the filter 22*f* is directly connected with the inlet of a safety valve 22*v*, which in particular is a non-return valve configured and specifically destined to allow the supply of water from its inlet to its outlet and for preventing the reflux of the water from the outlet toward the inlet. Downstream of the safety valve 22*v*, the water lies at a second pressure P2 higher than the first pressure P1. In a specific embodiment, the second pressure P2 is equal to 8 bars. The outlet of the safety valve 22*v* is connected with a three-way connector, in particular being connected on a first way of this connector. On a second way of this connector is connected the inlet of the boiler 22*b*, whose purpose is to bring the water there introduced at a temperature close to the boiling temperature. The outlet of the boiler 22*b* feeds directly the outlet of the unit 22*u*, the quale in turn is connected with the first inlet 12 of the faucet 10**.

The third way of the connector is connected with the anti-reflux device **22*i*, which is positioned outside the unit, through an auxiliary outlet 22*a* of the unit. In a preferred but non-limiting embodiment, this device comprises a free-venting funnel, which is connected with a sewage outlet duct. The purpose of the free-venting funnel is to allow the escape of the water possibly refluent from the sewage outlet prior to the contamination of the line of the source of conditioned water or fluid. The anti-reflux device 22*i*** shall be positioned at a height higher with respect to the height at which lies the siphon of the sewage outlet.

It is then also part of the present disclosure at least a source of conditioned water or fluid, in particular a plurality of sources of conditioned water or fluid 22-25, suitable for being connected with the faucet 10. The source of conditioned water or fluid is configured for supplying in use at least a conditioned water or fluid for heating, in particular heating close to boiling temperature, cooling, in particular cooling close to freezing temperature, by gasifying, in particular by addition with carbon dioxide, and/or by filtration, in particular by mechanical or chemical filtration.

The plurality of sources of conditioned water or fluid 22-25 comprises at least a data transmitting module, configured for transmitting a univocal identifying signal S of a particular source of conditioned water or fluid 22-25, in such a way that this source of conditioned water or fluid is electronically distinguishable and selectively activable with respect to other sources of conditioned water or fluid 22-25 simultaneously connected to the faucet 10.

The Applicant has specifically considered that the electronic device 1 and at least one of the sources of conditioned water or fluid 22-25 can be sold in kit. Also, this kit can be realized from a faucet 10 and from one of the sources of conditioned water or fluid 22-25.

Although reference has been made in this description to a faucet provided with four inlets (first inlet 12, second inlet 13, third inlet 14, fourth inlet 15) for sources of conditioned water or fluid 22-25, this number should not be understood in a limiting way, but allows to understand that the faucet herein described can allow the modular connection of many sources of conditioned water or fluid 22-25 and can in particular be supplied with a number of inlets lower or higher with respect to the one described.

It is furthermore noted that the presence of valves 18, in particular when positioned within the body 10B of the faucet, allows the functionality of the faucet even if some of its inlets 11-15 are not connected to any source of conditioned water or fluid 22-25.

In fact, by isolating through a respective closed valve 18 for example the third and the fourth inlet 14, 15, the faucet 10 in the specific embodiment herein described could maintain unaltered functionality. It is clear that part of the commands which control the supply of the third 14 and fourth 15 inlets would not work or should be excluded, but the commands relating to the connected inlets would instead be active and efficient. For this reason, conveniently the faucet 10 can be realized with a number of inlets 12-15 equal to the maximum number of the sources of conditioned water or fluid 22-25 which one wants to operatively associate to the faucet 10, for then proceeding with the connection of for example two or three sources to any inlet between the plurality of inlets 12-15 (for example the second and the fourth inlet) and realizing the logical association of the commands with these inlets.

It is herein described a particular embodiment of the faucet 10 according to the present disclosure. In this embodiment, the electronic device comprises at least a first command 3 for selecting a supply of an outlet 16 of the faucet 10 with water coming from at least an inlet 12-15.

In this embodiment is always present the data processing unit 2 which, also in this case, is operatively associated to the first command 3. This data processing unit 2 is operatively connected to a memory.

The electronic device 1 is configured for being activated in at least a self-learning operating configuration wherein, the data processing unit 2, according to a connection of at least a first source of conditioned water or fluid 22 to at least an inlet 12-15, determines automatically an enabling of at least a first combination of actuation of the first command 3 allowing a first configuration of supply of the outlet 16 by means of water coming from at least a first selected inlet of the plurality of inlets 12-15 or from a first selected set of inlets of the plurality of inlets 12-15.

In other words, in the self-learning configuration, the faucet 10, through the electronic device 1 recognizes which source was connected to one or more of the inlets 12-15 and, basing on previously stored parameters and which will be described in more detail below, configures in an automatic way the command 3 so that behind a particular combination of activation it is possible to select precisely the source connected. For example, an operator connects a first source of sparkling water to one or more of the inlets 12-15 of the faucet 10, for example at the first inlet 12. The faucet 10, through the electronic device 1, recognizes that a source has been connected to the first inlet 12 and that this source is a source of sparkling water. The electronic device 1 associates automatically a command of left rotation of a ring of the command 3 in such a way that, when this ring is in use rotated to the left, sparkling water, coming from the above-mentioned source, is dispensed from the outlet 16.

For this reason, the first inlet or the first set of inlets is univocally associated, in an associative datum 30 stored in the memory, to the first source of conditioned water or fluid 22.

In the light of the above example, it is clear that the electronic device 1 is also configured for being activated in at least an operating configuration of dispensing. In this configuration, an activation of the first command 3 in the first combination of actuation determines, through the data processing unit 2 and in an automatic way, a loading of the first associative datum 30 from the memory, and a dispensing on the outlet 16 of water coming from the first selected inlet or by the first selected set of inlets according to the first associative datum 30.

Clearly, self-learning is not limited to a single source. Consequently, in the self-learning operating configuration, the data processing unit 2, according to a connection of at least a second source of conditioned water or fluid 23 of the plurality of sources of conditioned water or fluid 22-25 potentially connectable to the inlets 12-15, determines automatically an enabling of at least a second combination of actuation of the first command 3 allowing a second configuration of supply of an outlet 16 by means of water coming from at least a second selected inlet or from a second selected set of inlets.

Also in this case, the second inlet or the second set of inlets is univocally associated, in a second associative datum 30' stored in the memory, to the second source of conditioned water or fluid 23.

In the second operating configuration of dispensing, an activation of the first command 3 in the second combination of actuation determines, through the data processing unit 2 and in an automatic way, a loading of the second associative datum 30' from the memory, and a dispensing on the outlet 16 of water coming from the second selected inlet or by the second selected set of inlets according to the second associative datum 30'.

From the electronic point of view, the activation of the first command 3 makes the data processing unit 2 transmit at least one among a signal of activation toward the first source of conditioned water or fluid 22 or the second source of conditioned water or fluid 23 and a signal of opening of at least a valve 18 operatively associated to the inlets of the plurality of inlets 12-15 of the faucet. This signal of activation, then, indirectly determining the supply of the outlet 16 of the faucet 10 through water coming from the first selected inlet or by the first selected set of inlets or, respectively, by the second selected inlet or by the second selected set of inlets.

Figures 14, 15:
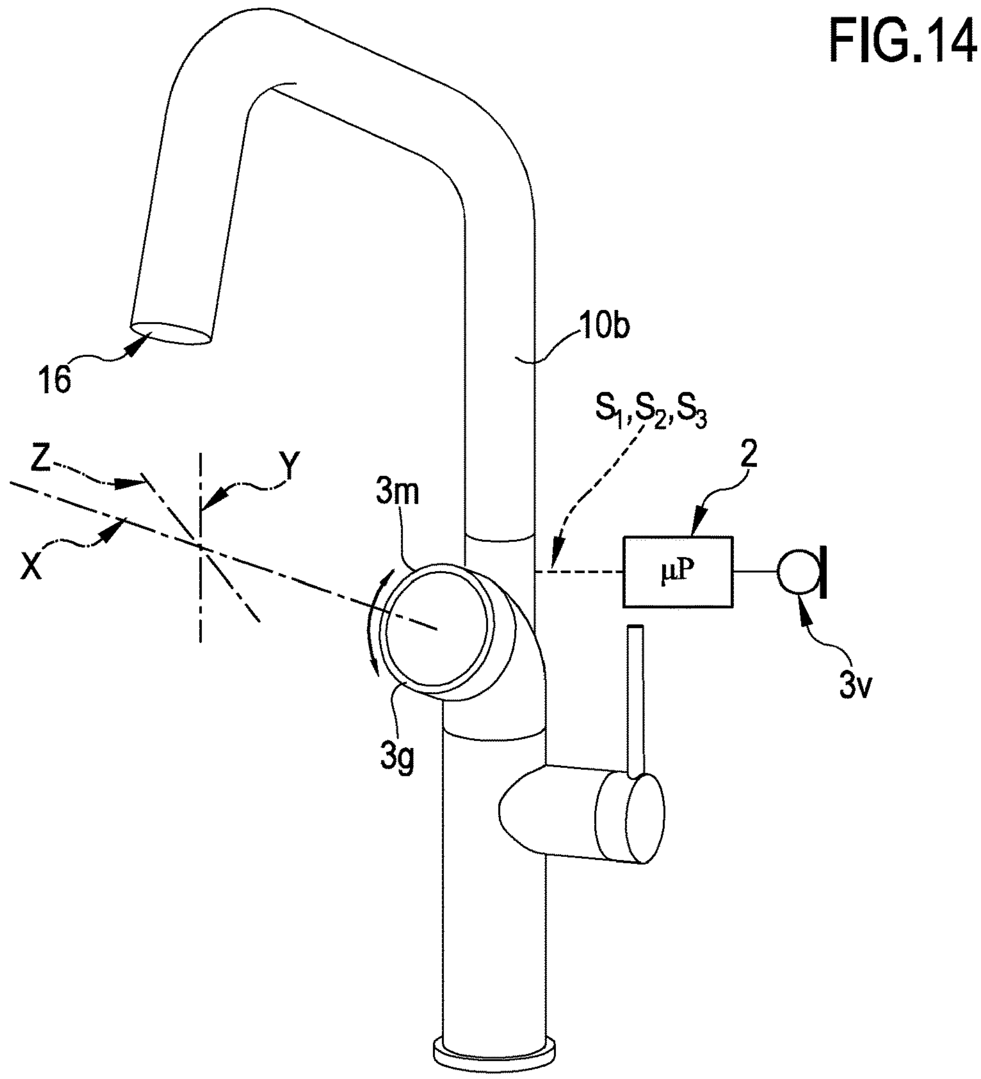
FIG. 14 shows a particular configuration of an electronic device object of the present disclosure.
FIG. 15 shows a first and a second configuration of association between a composite movement of a ring of command of the electronic device and a selection and/or dispensing of water from a source.

FIG. 15 shows a specific and non-limiting embodiment of a command 3. This command comprises a controller and a monitor 3*m*. The monitor 3*m* can be considered optional for the purposes of the present disclosure. Where present, the monitor 3*m* is operatively connected with the controller, and is in particular electrically and/or optically connected with the controller.

The controller and the monitor 3*m* can be conveniently integrated with an attractive design in the body of the faucet, preferably in correspondence of the basis of the latter so that they are, in use, positioned a few centimeters from the base of the top 50 of the sink on which the faucet is installed. In an embodiment the monitor 3*m* is positioned a little above the dispensing command 10C, but this specific spatial arrangement should not be intended in a limiting way. In fact, in another embodiment, the monitor 3*m* can be positioned under the dispensing command 10C. This other embodiment is not shown. Preferably, the monitor 3*m* is inclined upwards in order to facilitate the reading by the user.

The controller is rotatable and/or translatable. In this way, the first and/or the second combination of actuation comprises a rototranslation of the controller.

Where present the monitor 3*m*, the activation of the command 3, in particular according to the first combination of actuation or the second combination of actuation, determines a transmission of a first and of a second signal S1, S2 to the monitor 3*m*.

In the self-learning operating configuration, the data processing unit 2 transmits an instruction signal S3 to the monitor 3*m*. This instruction signal can be useful for allowing the subject that is configuring the faucet 10 and the electronic device 1 to learn that the self-learning is ended and/or to learn how to perform the first and/or the second combination of actuation.

More specifically, the rotatable and/or translatable controller comprises at least a ring 3*g* clockwise or anticlockwise rotatable and/or translatable. The translation of the ring 3*g* can take place:

- along a translation axis parallel to a rotation axis X of the ring; and/or
- along a first axis Y and, optionally in addition or alternatively, along a second axis Z which is (or are) orthogonal to the rotation axis X of the ring 3*g*.

It is noted that this first and second axis Y, Z are reciprocally orthogonal.

The ring 3*g* can then be activated by the user in a composite movement of rototranslation, thanks to which it is possible to associate a large number of controls, that in turn allows using a single ring for controlling a huge amount of sources of conditioned water or fluid all of them operatively associate to a single faucet.

It is noted that in a particular embodiment, the ring 3*g* can comprise at least a stable rest position and at least an unstable position. In this case the composite movement can determine a movement of the ring from the rest and stable position to the unstable position.

Returning again to signals S1 and S2, it is noted that these signals, when transmitted by the data processing unit 2 toward the monitor 3*m*, comprise at least one datum indicative of a conditioning of the water dispensed through the outlet 16 of the faucet 10, in particular one datum indicative of a temperature, and/or gasifying and/or filtration of the water dispensed through the outlet 16 of the faucet 10. This datum can cause the representation of symbols and/or alphanumeric characters associated with the specific typology of conditioning brought by the source of interest to the water. For example, where the source heats the water at a temperature close to the boiling temperature, the signal S1 or the signal S2 may cause the appearance of a red colored symbol, while where the source cools down the water at a temperature close to the freezing temperature, the signal S1 or the signal S2 may cause the appearance of a blue colored symbol. Also the first or the second signal S1, S2 can determine the appearance on the monitor 3*m* of a datum of temperature of the water dispensed through the outlet 16.

The symbol and/or alphanumeric characters presented on the monitor 3*m* can be fixed in time and remain visible for the entire duration of the dispensing, or be variable in time and/or remain visible for a time lower than the time of duration of the dispensing. In general, it can therefore be indicated that at least one among the first or second signal causes a time-variant graphical representation on the monitor 3*m*. Also, the transmission of the first and/or of the second signal S1, S2 from the data processing unit 2 to the monitor 3*m* can determine the identification of the source of conditioned water or fluid which is involved in the dispensing. In this case the first and/or the second signal S1, S2 contains an identifying datum of a source of conditioned water or fluid 22-25 operatively connected to the at least one inlet 12-15.

Figure 16:
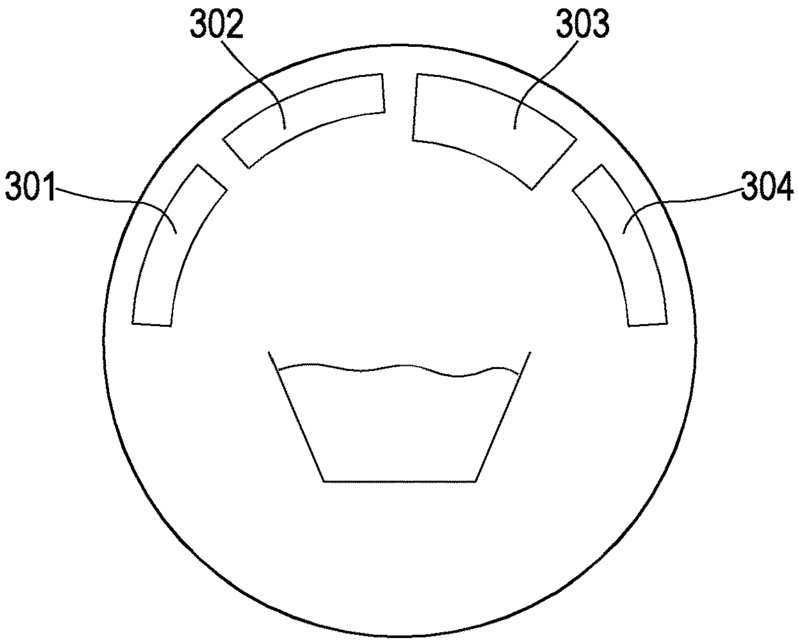
FIG. 16 and FIG. 17 show a first and a second schematic representation of a respective first and second screen present on a control monitor.
Figure 17:
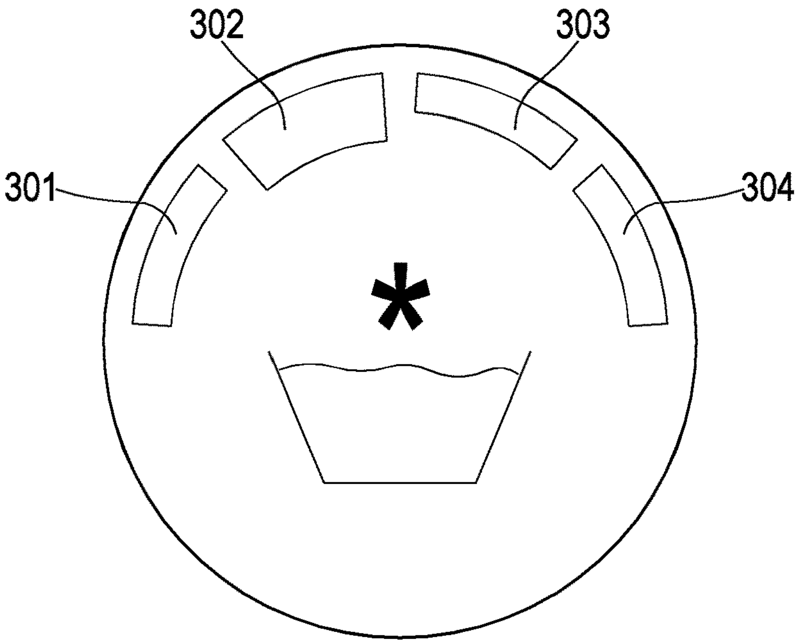

FIG. 16 and FIG. 17 show two non-limiting embodiments relative to schematic examples of graphic representation which appears on the monitor 3*m*. In particular in FIG. 16 is represented an embodiment wherein it is highlighted the presence of a symbol of a glass containing water. Four icons arranged in an arc of circumference on the outer edge of the monitor 3*m* visually identify, through differentiated colors, features of the water to be dispensed and are attributable to a dispensing performed by a specific source between the sources of conditioned water or fluid. In an embodiment. In FIG. 16 is represented another embodiment wherein it is highlighted the presence of a symbol of a glass containing water. The four mentioned icons are again present. An asterisk visually identifies the presence of cooled water, for example supplied from the source of conditioned water or fluid which is configured for dispensing water at a temperature of about 5° C. The source selected is identified through a representation of one of the four icons with a thickness higher with respect to the one of the remaining icons. In FIG. 15, among the four icons 301-304 represented on the monitor 3*m*, the icon 303 is the one with higher thickness. In case of FIG. 17, the icon with higher thickness is the one identified by the numerical reference 302.

The Applicant notes that a particularly advanced embodiment of the electronic device 1 herein described is the one in which, in the operating configuration of dispensing, the activation of the command 3 with the first and/or the second combination of actuation, determines a loading of the first associative datum 30 and/or of the second associative datum 30' and a consequent dispensing of water on the outlet 16 for a time and/or a water volume defined according to when there is an activation itself.

In particular, in fact, the data processing unit 2, through the command 3, allows to enter into a function of preset, easily identifiable by the user through for example a gear-shaped icon shown on the monitor 3*m*, which allows to for example automatically preselect one or more parameters of dispensing; in particular in the function of preset is possible to adjust a volume of water to be dispensed from the outlet 16 of the faucet 10. In this function, for example, a clockwise rotation of the ring increases in defined steps (for example, 50 ml or 100 ml, or 200 ml or 500 ml) the volume of water, or of fluid, dispensed in use. The volume of conditioned water or of fluid desired by the user can be confirmed with an axial movement ring 3*g* along the axis X. In an embodiment, the variation of dispensing volume selected through the ring 3*g* can be automatically associated to a variation of the message shown on the monitor 3*m*; in particular, the increase of the volume of water in use dispensed can be presented with an icon representing water fluctuating which increases its height as the dispensing volume preselected by the user increases. The user can in particular select through the command 3 a dispensing of water with volumes expressed with the international metric system, in liters, or according to the Anglo-Saxon system.

The Applicant has in particular noted that there may be a need for a user to fill a certain water container several times with always the same, predefined volume of water or of fluid. The Applicant has noted that it is convenient, for the user, to be allowed to store in a smart faucet the dispensed volume.

In another embodiment, through the command 3 the user can start the dispensing of a volume of water predefined by the user through a first action on the command 3, and end the dispensing of the determined volume of water with a new (second) action on the command 3.

In an embodiment, then, the user accedes through the command 3 to a self-learning setting, acts on the command 3 for example holding it down, causing an automatic start of dispensing of the conditioned water or fluid from the outlet 16; the electronic device starts a step of counting of a dispensing time and/or of dispensing volume of the conditioned water or fluid. Once the desired volume has been reached, the user releases the command 3 determining an automatic stop of the dispensing of the conditioned water or fluid.

In an alternative embodiment, the user accedes through the command 3 to a self-learning setting, acts on the command 3, for example pressing it a first time, causing an automatic start of dispensing of the conditioned water or fluid from the outlet 16; the electronic device starts a step of counting of a dispensing time and/or of dispensing volume of the conditioned water or fluid. Once the desired volume has been reached, the user presses again the command 3 determining an automatic stop of the dispensing of the conditioned water or fluid.

In this way, the user may also not know the actual capacity of the container to be filled, but would in any case be able to determine the storage of the correct volume, or equivalently of the correct dispensing time, for that determined container, by simply stopping the dispensing when the container is filled for an amount desired by the user (for example, completely filled).

In the light of the above, it is then clear that the present disclosure also concerns a particular embodiment of the electronic device 1 comprising:

at least a first command 3 through which it is possible to carry out, by the user, a selection of a supply of an outlet 16 of the faucet 10 with water coming from at least one inlet of a plurality of inlets 12-15 of the faucet 10;

a data processing unit 2 operatively associated to the at least a first command 3;

a memory operatively accessible from the data processing unit 2.

In the electronic device herein described, the data processing unit 2 is configured for enabling a dispensing of conditioned water or fluid according to customized dispensing volume of conditioned water or fluid and/or according to a customized dispensing time of conditioned water or fluid.

The dispensing volume and/or dispensing time is selected on the basis of at least a predefined activation or actuating sequence of the at least a first command 3, preferably on the basis of a first and a second activation or actuating sequence of the at least a first command 3.

Therefore, the electronic device 1 is configured for being activated in at least a self-learning operating configuration, and wherein in the self-learning operating configuration of the data processing unit 2 is configured for storing in the memory at least a dispensing datum corresponding to the customized dispensing volume from a user of conditioned water or fluid and/or to the customized dispensing time of conditioned water or fluid, optionally after of the predefined activation or actuating sequence of the at least a first command 3, preferably after of the first and of the second activation or actuating sequence of the at least a first command 3.

More preferably for each inlet 12-15 (or equivalently for each source 22-25) it is possible to have a storage of a single dispensing data customized by the user, or more dispensing data customized by the user. In the latter case, the user can define a customized dispensing of a volume equal to 550 ml (first dispensing data customized by the user) and of a volume equal to 575 ml (second dispensing data customized by the user), in addition, or in replacement, to the preset data, wherein at company level are stored dispensing data (not customized by the user, but selectable at will by the user) corresponding to the aforementioned 50 ml or 100 ml, or 200 ml or 500 ml). It then appears clear that the device so far described is actually very flexible in allowing the user to select pre-set volumes of water ex-factory or selected by him based on actions on the command 3.

The electronic device 1 is configured for being activated in at least a self-learning operating configuration wherein the data processing unit 2, according to a connection of at least a first source of conditioned water or fluid 22 of the already mentioned plurality of sources of conditioned water or fluid 22-25 to at least an inlet of the plurality of inlets 12-15, determines automatically an enabling of at least a first combination of actuation of at least a first command 3 allowing a first configuration of supply of the outlet 16 by means of water coming from at least a first selected inlet among the inlets of the plurality of inlets 12-15 or from a first selected set of inlets of the plurality of inlets 12-15. The first inlet or the first set of inlets is univocally associated, in an associative datum 30 stored in the memory, to the first source of conditioned water or fluid 22.

The electronic device is then configured for being activated in at least an operating configuration of dispensing, in which an activation of the first command 3 in the first combination of actuation determines, through the data processing unit 2 and in an automatic way, a loading of the first associative datum 30 from the memory, and a dispensing on the outlet 16 of water coming from the first selected inlet of the plurality of inlets 12-15 or by the first selected set of inlets of the plurality of inlets 12-15 according to the first associative datum 30.

In this way in the memory operatively accessible by the data processing unit 2 is stored a water dispensing time (corresponding indicatively at a determined volume) or, alternatively, a determined volume of water to be dispensed through the faucet 10. During the dispensing, the monitor 3*m* can conveniently display a time-variant icon, for example a gradually increasing level of fluid increasing with dispensing time and/or volume. Conveniently, in this latter case the faucet 10 can be provided with a sensor suitable for measuring a dispensed volume. This dispensing time or volume are non-limiting examples of parameters of dispensing of water that can be set at will by the user within the limits imposed by the manufacturer of the electronic device 1 and/or by the manufacturer of the sources of conditioned water or fluid. Further non-limiting examples of parameters of dispensing which can be set at will by the user are a temperature of the water and/or a percentage of addition of $CO_2$ in the water dispensed.

The data processing unit 2 of the electronic device 1 also allows resetting one or more of dispensing parameters set by the user. The data processing unit 2 allows also resetting the electronic device 1 to factory values.

A specific embodiment of the electronic device 1 allows customizing the specific actuating sequence of the command 3 which shall be carried out for allowing the dispensing of water from the outlet 16 through one or more of the inlets 12-15. In this case the electronic device 1 allows to start a self-learning operating configuration, in which the data processing unit 2, when the command 3 is activated in a first combination of actuation, memorizes in an automatic way, through a first associative datum 30, a first configuration of supply of the outlet 16 of the faucet 10 with water coming from a first selected inlet of the plurality of inlets 12-15 or from a first selected set of inlets of the plurality of inlets 12-15. In this self-learning operating configuration, the data processing unit 2, when the command 3 is activated in a second combination of actuation, memorizes in an automatic way, through a second associative datum 30, a second configuration of supply of the outlet 16 of the faucet 10 with water coming from at least a second selected inlet of the plurality of inlets 12-15 or from a second selected set of inlets of the plurality of inlets 12-15.

After the completion of the self-learning operating configuration, the electronic faucet herein described can be arranged in an operating configuration of dispensing, wherein when an activation of the command 3 in the first combination of actuation takes place, the data processing unit 2 loads from the memory the first associative datum 30, and causes a dispensing on the outlet 16 of water coming from the first selected inlet of the plurality of inlets 12-15 or from the first selected set of inlets of the plurality of inlets 12-15. Also, in this operating configuration of dispensing, when there is an activation of the command 3 in the second combination of actuation, the data processing unit 2 loads from the memory the second associative datum 30, and causes a dispensing on the outlet 16 of water coming from the second selected inlet of the plurality of inlets 12-15 or from the second selected set of inlets of the plurality of inlets 12-15.

In a rest condition, the electronic device 1 can be configured for having on the monitor 3*m* a predefined message, for example time-variant; in an embodiment, this predefined message includes a date and/or time.

Further features of adjustment are also made possible through the data processing unit 2. In particular it is made possible an adjustment of the brightness, of the language of presentation of one or more messages. Particular data are stored in the memory of the data processing unit 2 for allowing carrying out such adjustments through the command 3.

Further embodiments of the electronic device 1 are herein below described. In these embodiments it can be present a vibration or sound unit 3*v*. In this case at least one among the first or the second signal S1, S2, when transmitted, determines the temporary activation of the vibration or sound unit 3*v*.

In an embodiment the data processing unit 2 can also be configured for receiving from one or more of the sources of conditioned water or fluid 22-25 data related to the status of the source itself, and for transmitting automatically, when a determined criterion is verified, a signal of status toward the monitor 3*m*. In particular, should the source of conditioned water or fluid comprise a filter, the signal of status may be advantageously indicating a status of the filter and may, in particular, allow to display on a monitor an icon or message indicative of the need of replacement or clogging of the filter. Should, on the other hand, the source of conditioned water or fluid comprise a gasifier, a signal of status will allow to display on the monitor an icon or message indicative of the need of replacement of the bottle of the gasifier. In an embodiment the data processing unit 2 can be configured for causing the activation of the vibration or sound unit 3*v* with the transmission of the signal of status.

It is noted finally that the electronic device 1 can be provided with a voice activation module; this voice activation module can comprise (or be configured with) a microphone and is operatively connected with the data processing unit 2.

Through the voice activation module it is possible to give orders of voice dispensing also without contact with the ring 3*g* or by moving the ring 3*g* with a simple and composite movement which allows the activation of a reception of a voice signal which is then processed by means of technique for example known through the data processing unit 2. The voice activation module is preferably arranged in substantial proximity of the ring 3*g*. It is noted in particular that, for this reason, the first combination of actuation and/or the second combination of actuation can be a combination of activation at least partially by voice.

It is noted finally that the sources of conditioned water or fluid 22-25 can be placed in a status of low or reduced energy consumption through a control signal transmitted from the data processing unit 2 with one or more of the above-mentioned modes. In particular, the data processing unit 2 can transmit a control signal toward one or more of the sources of conditioned water or fluid 22-25 which allows to reduce the energy consumption of said one or more sources of conditioned water or fluid 22-25 for determined predefined time intervals (for example during the night or during the holidays), and/or which allows to reduce the energy consumption of said one or more sources of conditioned water or fluid 22-25 by reducing the activity and then the energy consumption of one or more subsystems of power of the source itself; the latter configuration implies a substantial deactivation of an operating functioning of the source of conditioned water or fluid. For example, if the source of conditioned water or fluid is destined to produce water at a temperature close to the boiling temperature, this control signal may determine the reduction of the water dispensing temperature in a range preferably comprised between 60° C. and 70° C., more preferably substantially equal to 65° C.

Applicant has finally realized a particular embodiment of the electronic device 1 configured for carrying out an electronic control of at least a characteristic of the conditioned water and/or of the fluid dispensed through the outlet 16 of the faucet 10, and for interrupting or preventing the dispensing (for example by disabling one or more of the sources of conditioned water or fluid 22-25) if these features come out from a selected range of values or exceed a threshold value. The features can be for example features of temperature and/or of quality of the water (for example characteristics of chemical composition).

In this embodiment, at least one among the electronic device 1 and the faucet 10 comprises at least a sensor, for example and non-limiting thereto a sensor of temperature or a sensor suitable for detecting the presence of one or more chemical substances (included the presence of at least a determined type of mineral), capable of producing a signal that the data processing unit 2 compares with the range selected of values or with the threshold; when occur the conditions of exceeding of the threshold or the outlet from the range selected of values, the data processing unit 2 determines the transmission of an alarm message, for example a visual and/or sound message, and determines an automatic, and preferably immediate, interruption of the dispensing of the conditioned water or fluid from the outlet 16.

It is therefore cleat that the present disclosure describes an electronic device 1, and a corresponding method, wherein the data processing unit 2 receives a control signal by the sensor configured for detecting at least a feature of a fluid, preferably at least one between a feature of temperature and/or of quality of the fluid, and is configured for comparing said control signal to at least a predetermined threshold value and for limiting and/or interrupting the dispensing of conditioned water from said at least a first source of conditioned water or fluid 22-25, in an automatic way, following the crossing of said at least a predetermined threshold value.

In general, the characteristic of the water, and more generally of the fluid, detectable through the sensor can be for example a between a temperature, pressure, presence of chemical substances, bacteria and/or viruses.

The advantages of the faucet 10 and of the electronic device 1 herein described are clear in the light of the preceding description. The faucet 10, which as it is clear from the above description, is preferably destined to domestic applications preferably in kitchen, can be installed in a very simple way, and the operator which carries out the installation is relieved of the burden of placing a high attention to the correct connection of the sources of conditioned water or fluid 22-25 to the correct inlet. Alternatively, for example, the faucet 10 can be destined to be installed for example in a bathroom or in an outdoor environment. Furthermore, the faucet 10 can be produced with a plurality of inlets also higher with respect to the number of sources of conditioned water or fluid 22-25 which indeed will be connected thereto, and also can be product without precise consideration as to which-between the potential sources of conditioned water or fluid 22-25 connectable to its inlets-will be the one actually connected in use.

The command 3 of the electronic device 1 is of intuitive use, the end user is relieved of the need to configure in a complex way the command 3 at the connection of the one or more sources of conditioned water or fluid.

Figure 18:
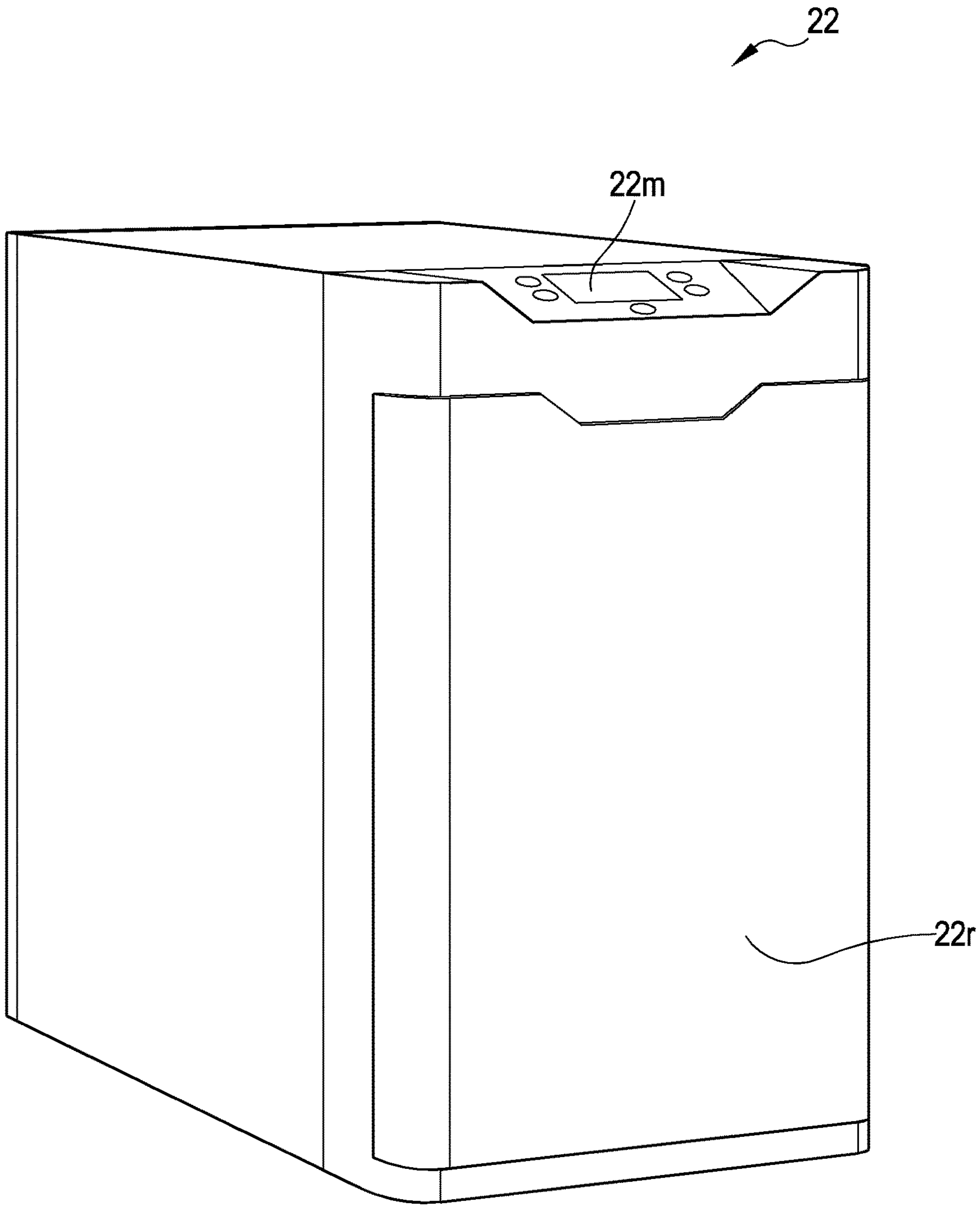
FIG. 18 shows a non-limiting embodiment of a source of conditioned water or fluid according to the present disclosure.

FIG. 18 shows finally a particular configuration of a source of conditioned water or fluid according to the present disclosure. The source of conditioned water or fluid comprises a substantially closed outer shell, preferably provided with a front door 22*r*, openable and closable for allowing the access of a specialized operator and/or of a user inside the source itself. For example, should the source of conditioned water or fluid 22 comprise a gasifier, this front door 22*r* will allow to access the inside of the source for replacing the bottle of $CO_2$.

The source of conditioned water or fluid further comprises a user interface 22*m*, which in an embodiment represented in FIG. 18 comprises a monitor and a plurality of control buttons. Through the user interface 22*m* it is possible to check a status of the source and/or configure the source in a mode of coupling with the electronic device 1 herein described. It is also possible to carry out an adjustment of one or more operating parameters of the source, among which—in a non-limiting way—a temperature of the water, a quantity of gas added to the water, a level of filtering of the water, a flow rate toward the faucet.

On the rear side, i.e. in position opposed with respect to the front door 22*r* is provided a plurality of electrical and hydraulic connections to ensure the functioning of the source. Between the hydraulic connections existing on the rear side of each source there is a connection of intake of water in pressure from a distribution network of water, in particular from a distribution network of potable water, in particular domestic. This connection allows supplying the source of conditioned water or fluid with water which will be later conditioned by the source itself.

It is noted finally that many sources of conditioned water or fluid 22-25 can be housed inside a shell; in this case, the set of a plurality of sources of conditioned water or fluid and of the said shell, optionally including the front door 22*r* and/or of the user interface 22*m* realizes a source group of conditioned water or fluid for the supply of the faucet 10, and this source group will be provided with a plurality of hydraulic connections to be connected with one or more of the previously described inlets 12-15.

It is noted finally that at least one between the sources of conditioned water or fluid can be destined to specifically configured for dispensing firstly a first typology of conditioned water and/or fluid and subsequently, a second typology of conditioned water and/or fluid. In particular, this source can be configured and specifically destined to dispense first sparkling water and subsequently sparkling water added with lemon juice.

The invention is not limited to the embodiments shown in the attached figures; for this reason, the reference signs which appear in the claims are provided for the sole purpose of increasing the intelligibility of the claims and are not to be intended in a limiting manner.

Finally, it is also clear that additions, modifications or variants, which are obvious to an expert in the art, can be applied to the object of the present disclosure, without thereby departing from the scope of protection provided by the attached claims.

The invention claimed is:

1. An electronic faucet for water dispensing, comprising:

a body of the faucet;

at least a first dispensing control for adjusting at least one of a water flow and a water temperature, an outlet for water dispensing, positioned in a predefined position;

a plurality of inlets of the body modularly selectable and/or installable, each of which is configured and specifically destined to be connected with any source of conditioned water or fluid of a plurality of sources of conditioned water or fluid configured for supplying in use conditioned water or fluid to said faucet; and an electronic device for controlling said faucet, the electronic device comprising:

at least a first control for selecting a supply of said outlet of said faucet with water from at least an inlet of said plurality of inlets of said faucet, said plurality of inlets being directly realized on said faucet or being realized in at least a connection module configured for being connected to the faucet;

a data processing unit operatively associated to said at least a first control; and a memory operatively accessible from said data processing unit;

said electronic device being configured for being activated in at least a self-learning operating configuration in which, the data processing unit, upon detecting a connection of a first source of conditioned water or fluid to a first one of the inlets of said plurality of inlets enables a first actuating combination of said at least a first control, which combination allows the supply of said outlet with conditioned water or fluid from the first inlet, and in which configuration the data processing unit stores in said memory a first univocal association of said first inlet to said first source of conditioned water or fluid;

said electronic device being configured for being activated in at least a dispensing operating configuration, wherein an actuation of said at least a first control with said first actuating combination causes said data processing unit to load from said memory the first univocal association, and to dispense on said outlet the conditioned water or the fluid which derives from said first inlet.

2. The electronic faucet according to claim 1, wherein said data processing unit is configured for enabling a dispensing of conditioned water or fluid according to at least a user customized or preset dispensing volume of conditioned water or fluid and/or according to at least a user customized or preset dispensing time of conditioned water or fluid; said user customized or preset dispensing volume and/or user customized or preset dispensing time being selected on a basis of at least a predefined actuation or actuating sequence of the at least a first control and/or wherein in said self-learning operating configuration said data processing unit is configured for storing in said memory a dispensing datum corresponding to said at least a user customized or preset dispensing volume of conditioned water or fluid and/or to said at least a user customized or preset dispensing time of conditioned water or fluid, said dispensing datum corresponding to an operating dispensing configuration customized by the user.

3. The electronic faucet according to claim 2, wherein in said dispensing operating configuration said predefined actuation or actuating sequence of the at least a first control determines an automatic loading, from said memory, of said dispensing datum corresponding to said customized dispensing volume of conditioned water or fluid and/or to said customized or preset dispensing time of conditioned water or fluid and determines a dispensing of conditioned water or fluid from said outlet for a volume and/or time corresponding to the customized dispensing volume of conditioned water or fluid and/or to the water dispensing time of said dispensing datum.

4. The electronic faucet according to claim 3, wherein said data processing unit is configured for storing in said memory at least a dispensing datum, for each inlet of said plurality of inlets and/or for each source of said plurality of sources of conditioned water or fluid for defining a corresponding plurality of user-customized dispensing operating configurations and/or wherein the inlets of said plurality of inlets are equal to each other and are configured for being selectively couplable, indifferently, to each source of said plurality of sources of conditioned water or fluid.

5. The electronic faucet according to claim 1, wherein in said self-learning operating configuration, the data processing unit, according to a connection of at least a second source of conditioned water or fluid of said plurality of sources of conditioned water or fluid to at least an inlet of said plurality of inlets automatically determines an enabling of at least a second actuating combination of said at least a first control allowing a second supply configuration of said outlet through water deriving from at least a second selected inlet of said plurality of inlets or from a second selected set of inlets of said plurality of inlets, said second inlet or said second set of inlets being univocally associated, in a second univocal association stored in said memory, to said second source of conditioned water or fluid;

and wherein in said dispensing operating configuration, an actuation of said at least a first control in said second actuating combination determines, through said data processing unit and in an automatic way, a loading of the second univocal association from said memory, and a dispensing on an outlet of water deriving from said second selected inlet of said plurality of inlets or from said second selected set of inlets of said plurality of inlets according to said second univocal association.

6. The electronic faucet according to claim 5, wherein in the dispensing operating configuration said data processing unit, when there is an actuation of said at least a first control in said first or said second actuating combination, is configured for transmitting at least one of an activation signal towards said first source of conditioned water or fluid or said second source of conditioned water or fluid and an opening signal of at least a valve operatively associated to one of the inlets of the plurality of inlets for determining the supply of the outlet of the faucet through water deriving from said first inlet or a first set of inlets or, respectively, from said second selected inlet or said second selected set of inlets.

7. The electronic faucet according to claim 5, wherein said at least a first control comprises at least a first and a second button, and/or comprises at least a rotatable and/or translatable controller and/or comprises at least a monitor operatively connected with said first and/or second button and/or with said at least a rotatable and/or translatable controller;

wherein said first and/or said second actuating combination comprises a rotation and/or translation of said rotatable and/or translatable controller and/or wherein the actuation of said at least a first control in said first or second actuating combination determines a transmission of a first and a second signal to said at least a monitor and/or wherein in said self-learning operating configuration said data processing unit transmits at least an instruction signal to said monitor.

8. The electronic faucet according to claim 7, wherein said rotatable and/or translatable controller comprises at least a ring rotatable clockwise or counter-clockwise and/or translatable along at least a translation axis parallel to a rotation axis of the ring and/or along at least a first axis and a second axis, at least one of said first axis and said second axis being orthogonal to the rotation axis of said ring, and wherein at least one of said first and said second actuating combination comprises a composite rototranslation movement of said ring, and wherein said rotatable and/or translatable ring has at least a rest and stable position and an unstable position, and wherein said composite rototranslation movement determines a movement of said ring from said rest and stable position to said unstable position.

9. The electronic faucet according to claim 7, wherein at least one of said first or second signal comprises at least one datum indicative of a conditioning of the water dispensed via the outlet of the faucet, and/or gassing and/or filtration of the water dispensed via the outlet of the faucet, and/or wherein said at least one of said first or second signal causes a time-varying graphical representation on said monitor, and/or wherein said at least one of said first or second signal contains a datum identifying a source of conditioned water or fluid operatively connected to said at least an inlet;

said electronic device comprising a vibration or sound unit, and wherein at least one of said first or said second signal causes a temporary activation of said vibration or sound unit.

10. The electronic faucet according to claim 5, wherein in said dispensing operating configuration, an actuation of said at least a first control in said first actuating combination and/or in said second actuating combination determines, through said data processing unit and in an automatic way, a loading of said first univocal association or of said second univocal association, and a dispensing on said outlet of a predefined amount of water defined on a volume and/or time basis, and/or wherein said at least a first control comprises a voice activation module and/or wherein said first actuating combination and/or said second actuating combination is an at least partially voice actuating combination, and/or wherein said data processing unit is configured for transmitting a control signal towards a source of conditioned water or fluid, said control signal being specifically destined to place said at least a source of conditioned water or fluid in a low power consumption condition and/or to deactivate an operating functioning of said source of conditioned water or fluid for a predetermined period of time; said control signal being transmitted from said data processing unit at an activation of said at least a control.

11. A method for controlling a faucet, comprising:

an activation of a self-learning operating configuration, wherein a data processing unit of an electronic device for controlling said faucet is operatively associated to at least a first control for selecting a supply of an outlet of the faucet with conditioned water or fluid which derives from at least an inlet of a plurality of inlets of said faucet, said plurality of inlets being directly realized on said faucet or being realized in at least a connection module configured for being connected to the faucet, the first control being part of said electronic device, wherein said data processing unit upon detecting a connection of at least a first source of conditioned water or fluid of a plurality of sources of conditioned water or fluid to at least a first inlet of said plurality of inlets, enables a first actuating combination of said at least a first control, wherein said first actuating combination allows the supply of said outlet with conditioned water or fluid from the first inlet, and wherein said data processing unit stores, in an operatively accessible memory, a first univocal association of said first inlet to said first source of conditioned water or fluid;

a loading from said operatively accessible memory into said data processing unit of said univocal association; and an activation of a dispensing operating configuration, wherein an actuation of said first control in said first actuating combination causes the data processing unit to loads from said memory said first univocal association, and to dispense on said outlet the conditioned water or the fluid which derives from said first inlet.

12. The method according to claim 11, comprising a step of enabling, by means of the data processing unit, a dispensing of conditioned water or fluid according to at least a user-customized or preset dispensing volume of conditioned water or fluid and/or according to at least a user-customized or preset dispensing time of conditioned water or fluid; said dispensing volume and/or dispensing time being selected on a basis of at least a predefined actuation or actuating sequence of said at least a first control, and/or wherein after the activation of said self-learning operating configuration said data processing unit determines a storage, in said memory, of a dispensing datum corresponding to said user customized dispensing volume of said conditioned water or fluid and/or to said user customized dispensing time of said conditioned water or fluid, after said predefined actuation or actuating sequence of said at least a first control, said dispensing datum corresponding to a user-customized dispensing operating configuration.

13. The method according to claim 12, wherein in said dispensing operating configuration said predefined actuation or actuating sequence of said at least a first control determines an automatic loading, from said memory, of said dispensing datum corresponding to said customized dispensing volume of conditioned water or fluid and/or to said customized dispensing time of conditioned water or fluid and a dispensing of conditioned water or fluid takes place from said outlet for a volume and/or time corresponding to the customized dispensing volume of conditioned water or fluid and/or to the water dispensing time of said dispensing datum.

14. The method according to claim 13, wherein after the activation of said self-learning operating configuration said data processing unit determines a storage, in said memory, of at least a dispensing of said plurality of inlets and/or for each source of said plurality of sources of conditioned water or fluid to define a corresponding plurality of user-customized dispensing operating configurations and/or wherein the inlets of said plurality of inlets are equal to each other and are configured for being selectively couplable to each source of said plurality of sources of conditioned water or fluid.

15. The method according to claim 11, wherein:

in the activation of a self-learning operating configuration the data processing unit, according to a connection of at least a second source of conditioned water or fluid of said plurality of sources of conditioned water or fluid to at least an inlet of said plurality of inlets, automatically performs an enabling of at least a second actuating combination of said at least a first control, the method comprises a loading from an operatively accessible memory to said data processing unit of a second univocal association identifying a unique association between a second inlet of the plurality of inlets or a second set of inlets of the plurality of inlets and said second source of conditioned water or fluid;

said second actuating combination is specifically destined to allow, in use, a second supply configuration of said outlet by means of water deriving from at least said second inlet of said plurality of inlets or from said second set of inlets of said plurality of inlets, according to said second univocal association; and upon activation of said dispensing operating configuration, when there is an actuation of said first control in said second actuating combination, the data processing unit, loads from said memory said second univocal association, and causes a dispensing on said outlet of water deriving from said second inlet of said plurality of inlets or from said second set of inlets of said plurality of inlets.

16. The method according to claim 15, wherein in the dispensing operating configuration said data processing unit, when there is an actuation of said at least a first control in said first or said second actuating combination, performs a transmission of at least one of an activation signal towards said first source of conditioned water or fluid or said second source of conditioned water or fluid and an opening signal of at least a valve operatively associated to one of the inlets of the plurality of inlets to determine the supply of the outlet of the faucet through water deriving from said first inlet or from a first set of inlets or, respectively, from said second inlet or from said second set of inlets.

17. The method according to claim 15, wherein the actuation of said control comprises the actuation of at least a first and a second button of said control, and/or comprises the actuation of at least a rotatable and/or translatable controller of said control and/or comprises an interaction with at least a monitor of said control, said monitor being operatively connected with said first and/or second button and/or with said at least a rotatable and/or translatable controller;

wherein said first and/or said second actuating combination comprises a rotation and/or translation of said rotatable and/or translatable controller and/or wherein the actuation of said at least a first control in said first or said second actuating combination determines a transmission of a first signal and of a second signal to said at least a monitor and/or wherein in said self-learning operating configuration said data processing unit transmits at least an instruction signal to said monitor.

18. The method according to claim 17, wherein said first and/or said second actuating combination comprises an actuation of at least a ring of said rotatable and/or translatable controller, said ring being rotatable clockwise or counterclockwise and/or translatable along at least a translation axis parallel to a rotation axis of the ring and/or along at least a first axis and a second axis, at least one of said first axis and said second axis being orthogonal to the rotation axis of the ring, and wherein at least one of said first and said second actuating combination comprises a composite rototranslation movement of said ring, and wherein said rotatable and/or translatable ring possesses at least a rest and stable position and an unstable position, and wherein said composite rototranslation movement determines a movement of said ring from said rest and stable position to said unstable position.

19. The method according to claim 17, wherein at least one of said first or second signal comprises at least a datum indicative of a conditioning of the water dispensed via the outlet of the faucet, in particular a datum indicative of a temperature, and/or gassing and/or filtration of the water dispensed via the outlet of the faucet, and/or wherein said at least one of said first or second signal causes a time-varying graphical representation on said monitor, and/or wherein said at least one of said first or second signal contains a datum identifying a source of conditioned water or fluid operatively connected to said at least an inlet;

and wherein at least one of said first or said second signal causes a temporary activation of a vibration or sound unit of said electronic device.

20. The method according to claim 15, wherein in said dispensing operating configuration, an actuation of said at least a first control in said first actuating combination and/or in said second actuating combination determines, by means of said data processing unit and in an automatic way, a loading of said first univocal association or of said second univocal association, and a dispensing on said outlet of a predefined amount of water defined on a volume and/or time basis, and/or wherein said method comprises the activation of a voice activation module of said at least a first control and/or wherein said first actuating combination and/or said second actuating combination is an at least partially voice actuating combination, and/or wherein the method comprises a transmission of a control signal from said data processing unit towards a source of conditioned water or fluid, said control signal being specifically destined to place said at least a source of conditioned water or fluid in a low power consumption condition and/or to deactivate an operating functioning of said source of conditioned water or fluid for a predetermined period of time; said control signal being transmitted by said data processing unit upon an activation of said at least a control.

* * * * *